March 27, 1951 F. L. CURRIE ET AL 2,546,630

TELEGRAPH SWITCHING SYSTEM

Filed July 9, 1948 22 Sheets-Sheet 1

INVENTORS
F. L. CURRIE
W. B. BLANTON

BY

M. R. Marsh

ATTORNEY

TELEGRAPH SWITCHING SYSTEM

Filed July 9, 1948 22 Sheets-Sheet 2

INVENTORS
F. L. CURRIE
W. B. BLANTON
BY
M. R. Marsh
ATTORNEY

March 27, 1951 F. L. CURRIE ET AL 2,546,630

TELEGRAPH SWITCHING SYSTEM

Filed July 9, 1948 22 Sheets-Sheet 3

*INVENTORS*
F. L. CURRIE
W. B. BLANTON

*BY* M. R. Marsh
ATTORNEY

March 27, 1951 F. L. CURRIE ET AL 2,546,630

TELEGRAPH SWITCHING SYSTEM

Filed July 9, 1948 22 Sheets-Sheet 4

INVENTORS
F. L. CURRIE
W. B. BLANTON

BY M. R. Marsh
ATTORNEY

TELEGRAPH SWITCHING SYSTEM

Filed July 9, 1948 22 Sheets-Sheet 5

INVENTORS
F. L. CURRIE
W. B. BLANTON
BY
M.R. Marsh
ATTORNEY

March 27, 1951 F. L. CURRIE ET AL 2,546,630

TELEGRAPH SWITCHING SYSTEM

Filed July 9, 1948 22 Sheets-Sheet 6

INVENTORS
F. L. CURRIE
W. B. BLANTON
BY
M. R. Marsh
ATTORNEY

TELEGRAPH SWITCHING SYSTEM

Filed July 9, 1948

INVENTORS
F. L. CURRIE
W. B. BLANTON
BY
M. R. Marsh
ATTORNEY

TELEGRAPH SWITCHING SYSTEM

Filed July 9, 1948 22 Sheets-Sheet 8

INVENTORS
F. L. CURRIE
W. B. BLANTON
BY
M. R. Marsh
ATTORNEY

TELEGRAPH SWITCHING SYSTEM

Filed July 9, 1948 22 Sheets-Sheet 9

INVENTORS
F. L. CURRIE
W. B. BLANTON
BY
M. R. Marsh
ATTORNEY

INVENTORS
F. L. CURRIE
W. B. BLANTON
BY
M. R. Marsh
ATTORNEY

March 27, 1951 F. L. CURRIE ET AL 2,546,630

TELEGRAPH SWITCHING SYSTEM

Filed July 9, 1948 22 Sheets-Sheet 11

INVENTORS
F. L. CURRIE
W. B. BLANTON

BY M. R. Marsh

ATTORNEY

INVENTORS
F. L. CURRIE
W. B. BLANTON
BY
M. R. Marsh
ATTORNEY

March 27, 1951 F. L. CURRIE ET AL 2,546,630

TELEGRAPH SWITCHING SYSTEM

Filed July 9, 1948 22 Sheets-Sheet 13

INVENTORS
F. L. CURRIE
W. B. BLANTON

BY

[signature]

ATTORNEY

March 27, 1951 F. L. CURRIE ET AL 2,546,630

TELEGRAPH SWITCHING SYSTEM

Filed July 9, 1948 22 Sheets-Sheet 14

INVENTORS
F. L. CURRIE
W. B. BLANTON

BY M. R. Marsh
ATTORNEY

March 27, 1951 F. L. CURRIE ET AL 2,546,330

TELEGRAPH SWITCHING SYSTEM

Filed July 9, 1948 22 Sheets-Sheet 15

INVENTORS
F. L. CURRIE
W. B. BLANTON
BY
M. R. Marsh
ATTORNEY

INVENTORS
F. L. CURRIE
W. B. BLANTON
BY
M. R. Marsh
ATTORNEY

INVENTORS
F. L. CURRIE
W. B. BLANTON
BY
M. R. Marsh
ATTORNEY

INVENTORS
F. L. CURRIE
W. B. BLANTON
BY M. R. Marsh
ATTORNEY

INVENTORS
F. L. CURRIE
W. B. BLANTON
BY
M. R. Marsh
ATTORNEY

March 27, 1951 F. L. CURRIE ET AL 2,546,630

TELEGRAPH SWITCHING SYSTEM

Filed July 9, 1948 22 Sheets-Sheet 20

INVENTORS
F. L. CURRIE
W. B. BLANTON

BY

M. R. Marsh

ATTORNEY

March 27, 1951 F. L. CURRIE ET AL 2,546,630

TELEGRAPH SWITCHING SYSTEM

Filed July 9, 1948 22 Sheets-Sheet 21

INVENTORS
F. L. CURRIE
W. B. BLANTON
BY
M. R. Marsh
ATTORNEY

INVENTORS
F. L. CURRIE
W. B. BLANTON
BY
M. R. Marsh
ATTORNEY

Patented Mar. 27, 1951 2,546,630

UNITED STATES PATENT OFFICE 2,546,630

TELEGRAPH SWITCHING SYSTEM

Frank L. Currie, Plainfield, N. J., and William B. Blanton, Rockville Centre, N. Y., assignors to The Western Union Telegraph Company, New York, N. Y., a corporation of New York Application July 9, 1948, Serial No. 37,894

8 Claims. (Cl. 178—2)

This invention relates to telegraph switching or exchange systems and more particularly to the switching equipment and control circuits at a telegraph central switching office where telegraph messages received over incoming lines or channels are directed to the desired outgoing line or channel and transmitted thereto without the necessity of manually repeating the relayed messages.

It is a general practice of telegraph systems to store the received messages at a central or switching office incident to the relaying thereof to an outgoing channel since the storing of the messages enables transmission over any line, either incoming or outgoing, at any time regardless of the busy condition of any other line. The storing of the messages in most systems of this nature is accomplished by perforating mechanisms responding to received signals which perforate a paper tape that is subsequently employed to control a transmitter. In larger switching centers the messages are stored twice, the first storage being in a tape in the perforators controlled by incoming line signals and the second storage by a perforator operated in response to signals transmitted intra-office from a transmitter associated with the first perforating mechanism. The storage tape of the second perforator controls a line sending transmitter at the sending position. It is to the double storage system that the present invention relates.

It is one of the objects of the present invention to provide a telegraph switching system of the above general type wherein more efficient use of the switching equipment is made.

In this respect another object of the invention is to arrange the switching equipment so that it is shared by certain of the outgoing circuits as, for example, the lightly loaded circuits or those having fewer messages transmitted thereover and which are or may be idle part of the time.

Another object of the invention is to provide a switching system wherein two types of intra-office transmission paths are established, namely, so-called direct intra-office transmission paths for heavily loaded circuits and paths through equipment shared in the establishment of other intra-office transmission paths to lightly loaded circuits.

Still another object of the present invention is to provide a switching system wherein an intra-office transmission path from an incoming line may be established to an outgoing line through any one of a plurality of different intra-office routes and through equipment used in common with the establishment of other such paths from other incoming lines.

A more comprehensive understanding of the various operational and functional aspects and features of the system and objects of the present invention may be had from a review of copending applications Serial Nos. 240 and 37,556, filed January 2, 1948, and July 8, 1948, respectively. Copending application Serial No. 240 discloses some of the features of a telegraph switching system consisting primarily of the above-mentioned so-called direct intra-office transmission paths as distinguished from the system disclosed herein which includes both the so-called direct and shared intra-office transmission paths and the manner in which they may be arranged and consolidated into a composite and comprehensive system including both types of intra-office transmission paths. Copending application Serial No. 37,556 discloses a system somewhat like the system of the instant application containing both direct and shared intra-office transmission paths with the assignment of the various shared circuits being controlled by a so-called alternate assignor.

The objects of the present invention will be more apparent in the following detailed description of a preferred embodiment thereof wherein reference is made to the accompanying drawings, in the latter of which:

*General description*

Figure 1:
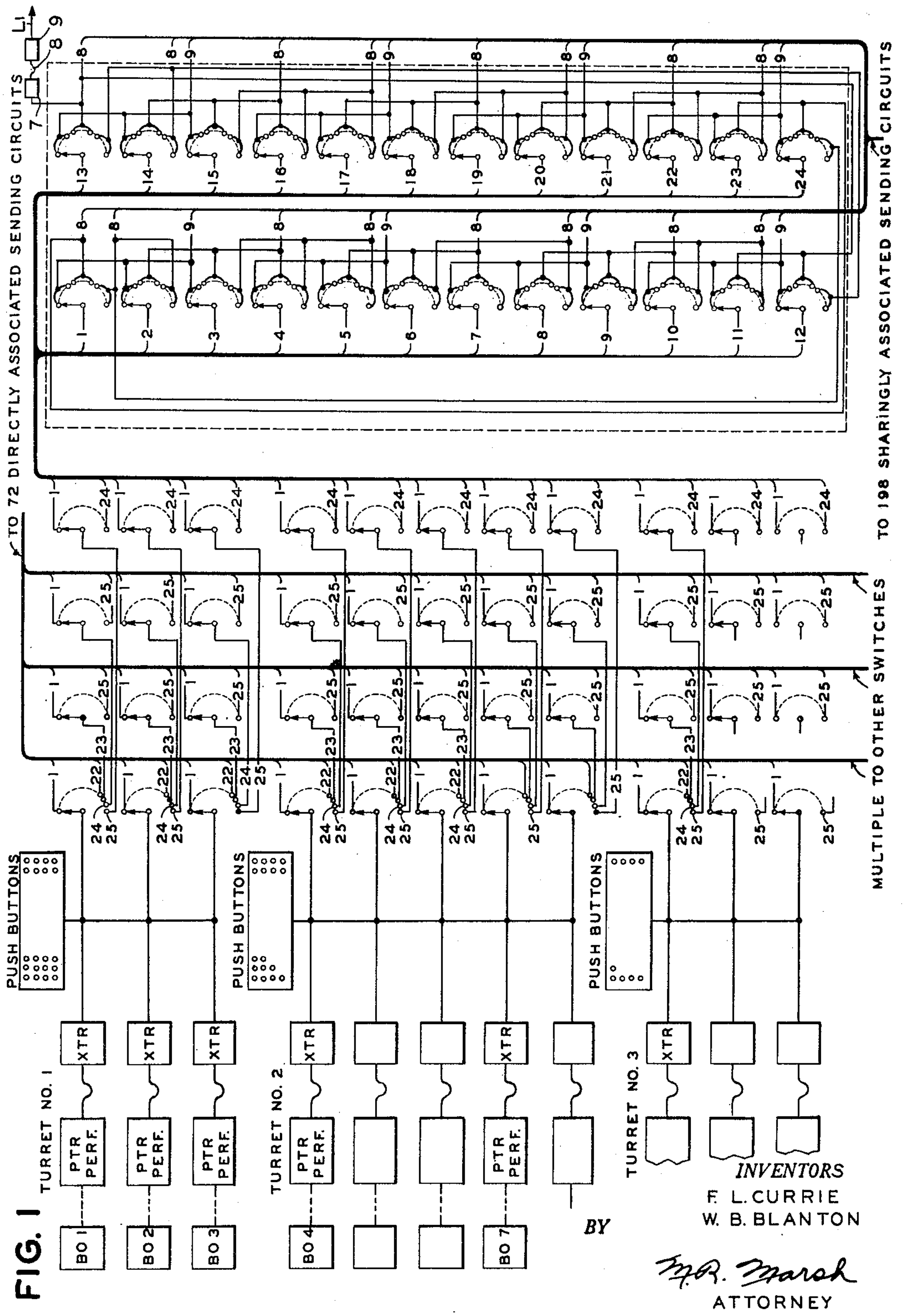
Fig. 1 is a schematic representation of a telegraph system embodying the principles of the present invention.

In accordance with the principles of the present invention, each incoming line is associated directly with a printer perforator, or has access thereto through a so-called concentrator arrangement, which operates to print and perforate the line signals on a storage tape. In Fig. 1, the printer perforators are represented by the reference numerals 2 terminating incoming lines L from branch offices such as BO—1 etc.

As indicated in Fig. 1, a number of receiving positions are grouped together into what are termed turrets and each turret has an associated push button panel 5 containing a push button for each destination to which a message may be sent from the switching center. In the arrangement of Fig. 1 the first turret has three receiving positions, the second turret five and the third turret three. Any convenient number of receiving positions may be included in a turret.

In accordance with the invention, the intra-office transmission paths are established by means of multi-level rotary switches and each receiving position has directly associated therewith four rotary switches and the group of turrets, such as three in the arrangement of Fig. 1, have associated therewith a sharing connector, represented by the rectangle 6, common to all the associated receiving positions. In the arrangement shown the sharing connector 6 has some twenty-four multi-level rotary switches.

In the preferred embodiment of the invention, each of the four rotary switches associated with each receiving position and the twenty-four of the sharing connector 6 has twenty-five points. From twenty-two points on the A or so-called direct selector rotary switch of each receiving position, and twenty-five points on the B and C or so-called direct connector rotary switches, it is possible to establish a total of some seventy-two so-called direct intra-office transmission paths to associated sending circuits. These paths are called direct paths or circuits in that such paths may be established independently of a path which may be established from any of the other receiving positions. The twenty-five direct paths or circuits established through rotary switches B and C also include respective points on rotary switches A. The twenty-fifth point of each rotary switch A extends to the D or so-called sharing selector rotary switch, the points of which extend to various sharing connector rotary switches in the sharing connector 6. As indicated in Fig. 1, the seventy-two directly associated sending circuit positions are multipled to corresponding points on each of the rotary switches A, B and C.

As will be described hereinafter in detail, each rotary switch of the turret connector 6 is capable of establishing a connection or transmission path from a receiving position to any one of some twenty-five so-called sharingly associated sending circuits. The sharingly associated circuits would be the lightly loaded ones while the directly associated circuits would be those heavily loaded such as trunks. Each rotary switch of the sharing connector 6 is made busy when a transmission path is established therethrough and in order that it be possible to establish transmission paths at substantially all times, each sharingly associated sending circuit is connected to a plurality of the sharing connector rotary switches.

When an intra-office transmission path is established either through the sharing connector 6 or to the directly associated sending positions, the intra-office transmitter 4 transmits the stored signals thereover and these signals control a perforator such as 7 which stores the signals a second time in a tape 8 employed to control a distributor transmitter associated with a sending line L1.

The transfer or switching of a message from the tape of a receiving position to the tape of a sending position is directed and controlled through the operation of push buttons. When the attendant observes the message in a receiving position, she notes the destination thereof by reading the printed characters in the tape and then conditions the associated receiving position for the transfer of its message by operating a so-called transmitter initiate push button, preferably located adjacent the receiving position transmitter. Such operation causes a "transmitter operate lamp" adjacent the transmitter to start flashing and another lamp, a "turret switching lamp" to start glowing. The flashing transmitter operate lamp indicates that the particular intra-office transmitter has been conditioned for the switching of its message and the glowing turret switching lamp indicates that a switching operation has been started at the turret but is incomplete.

The attendant next depresses a destination push button representing the destination to which the message is to be sent and it is held depressed until the intra-office path has been established. The establishment of this path is indicated by the transmitter operate lamp changing from the flashing to a steady glowing condition and by the turret switching lamp ceasing to glow.

The destination indicating push buttons such as 5, Fig. 1, are common to the receiving positions of a turret and the operation of a transmitter initiate push button seizes the common equipment until the desired transmission path has been established, and during this period prevents other receiving positions from being activated or conditioned for the transmission of messages therein. However, since the establishment of a transmission path is effected in a time interval of only a fraction of a second, the common equipment is not unduly tied up and as soon as the path is established, the common equipment is released for use by the other receiving positions.

In the case of establishing a transmission path through the A rotary switch associated with a receiving position, only this switch is caused to step to its desired point, and if the desired intra-office circuit happens to be busy, the switching equipment operates to transmit the message intra-office when the circuit becomes idle. When an intra-office path is established through the A rotary switch as well as either a B or a C rotary switch, the two involved switches step together as do the A and D rotary switches when a path is established through the sharing connector. In addition to the stepping of rotary switches A and D on establishment of a path through the sharing connector 6, the involved rotary switch therein will also step at this time and when the wipers thereof reach the proper point, control relays operate and the intra-office transmitter is connected to the desired sending position.

Because each of the rotary switches in the sharing connector 6 provides connections to some twenty-five intra-office circuits and since a number of receiving positions share the use of a common sharing connector to reach these intro-office circuits, three sharing connector rotary switches are associated together for each eight or nine intra-office circuits. These intra-office circuits are multipled to the points of the three switches and a control means is provided so that when a message requires connection to one of these intra-office circuits from any one of the intra-office transmitters, the first one of these three switches if idle will make the connection, but if it is busy the second one if idle will make the connection, and if it also is busy, the third if idle will make the connection. Hence each intra-office circuit appearing on the points of three different rotary switches in the sharing connector provides three possibilities for completing a connection between an intra-office transmitter and a sending position.

If all three switches through which an intra-office circuit may be established are busy, a turret busy lamp is caused to glow and thereby inform the attendant that due to a busy condition of the common equipment, the particular message can not be switched at this time. Normally under such conditions the attendant would switch a message from another intra-office transmitter and at some later time switch the previous message.

*Intra-office transmitter circuit*

Figures 2, 23:
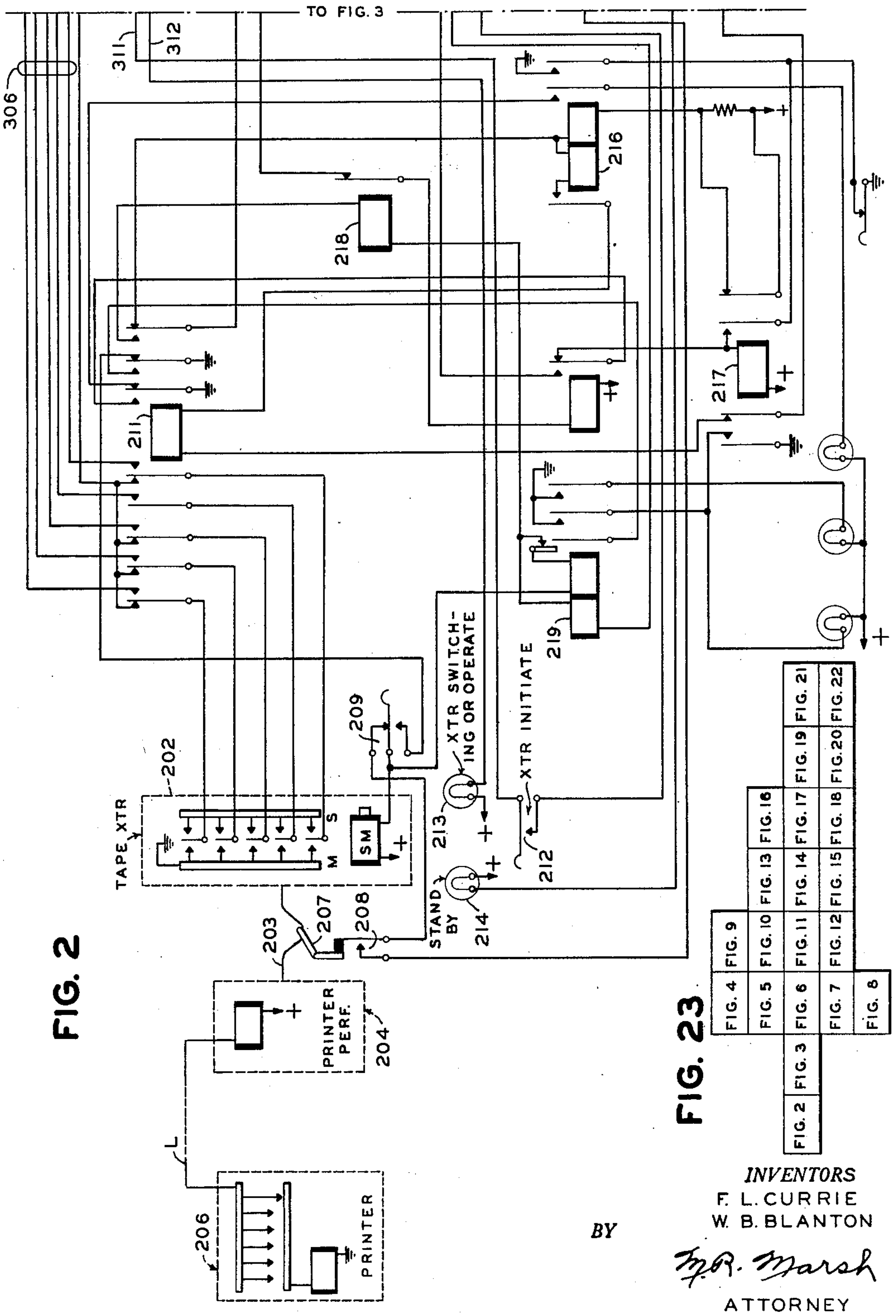
Figs. 2 and 3 are details of a so-called intra-office transmitter circuit or the control circuits for effecting transmission from the transmitter associated with the signal controlled reperforator.
Fig. 23 shows the manner in which Figs. 2 to 23 may be arranged with respect to each other to illustrate the details of a complete system.

The intra-office transmitter circuit is the equipment and control circuits employed in conjunction with the transmission of a message intra-office as, for example, the transfer of a message from the receiving equipment terminating an incoming line to the sending equipment at an outgoing line. The details of the intra-office transmitter circuit employed in the present system are disclosed in Figs. 2 and 3 and include primarily a tape transmitter 202 with associated relays and control circuits. As indicated in Fig. 2, the tape transmitter is controlled by a perforated tape 203 prepared by a perforating mechanism 204, responding to signals received over line L from a sending mechanism such as a send-receive printer 206 at a distant office. The perforating mechanism 204 stores the received message signals in the perforated tape 203 and in the preferred embodiment this mechanism prints representative characters on the tape and is sometimes called a printer perforator.

The send-receive printer 206, the printer-perforator 204 and the tape transmitter 202 are well known units of equipment in the telegraph art and their operation is well understood. For the time being, it will be assumed that the tape 203 between the tape transmitter and the printer perforator contains only blanks, so-called all spacing message separating characters or carriage return signals having the fourth pulse only marking and that a taut tape condition exists. The taut tape condition operates the tape lever 207 to open tape lever contacts 208. The message separating characters in the tape 203 may be produced either under control of the operator at the distant station or the printer perforator may be provided with a manually controlled or full automatic tape feed-out device which permits sufficient blank tape to be fed out of the printer perforator to enable the last message character perforated in the tape to reach and pass beyond the sensing pins of the tape transmitter. Tape feed-out devices of this type are well known in the art.

Under the assumed conditions when the distant operator begins to transmit message material to the printer perforator at the switching center, the accumulation of perforated tape between the printer perforator and the tape transmitter will permit the tape lever contacts 208 to close and establish a circuit for operating the step magnet SM of the tape transmitter. This circuit extends from potential through the coil of the step magnet SM, upper contacts of key 209, tape lever contacts 208, the second left-hand tongue and back contact of relay 316, the right hand tongue and back contact of relay 302, then through an impulse generator or circuit interrupter 303 to ground. The above circuit causes the step magnet SM to be periodically energized and advance the tape 203 through the transmitter, and his operation is sometimes called idling tape through a transmitter.

When the first message character or any other than a carriage return perforation is advanced into association with the sensing pins of the transmitter, one or more of the tongues thereof, with the exception of the fourth, contacting the grounded marking bus bar completes a circuit for operating relay 302. This circuit extends from the marking bus bar through one or more of the left hand tongues and back contacts with the exception of the second tongue of relay 211 and the coil of relay 302 to potential. Relay 302 thereupon operates and interrupts the above-described circuit to the step magnet SM of the tape transmitter. Accordingly, further advancement of the tape therethrough ceases and the first message character is retained in association with the sensing pins. For the time being nothing more occurs at the intra-office transmitter circuit with the exception of further accumulation of tape ahead of the transmitter until the intervention of the attendant. The attendant may be apprised of the storage of message material in the tape 203 by any one of a number of well known types of signaling and/or alarm devices which inform her that a message has been received or is being received and that she should proceed to direct a switching operation. The attendant may also be aware of the presence of message material by visually observing the accumulation of the tape 203 between the printer-perforator and the tape transmitter.

Figure 3:
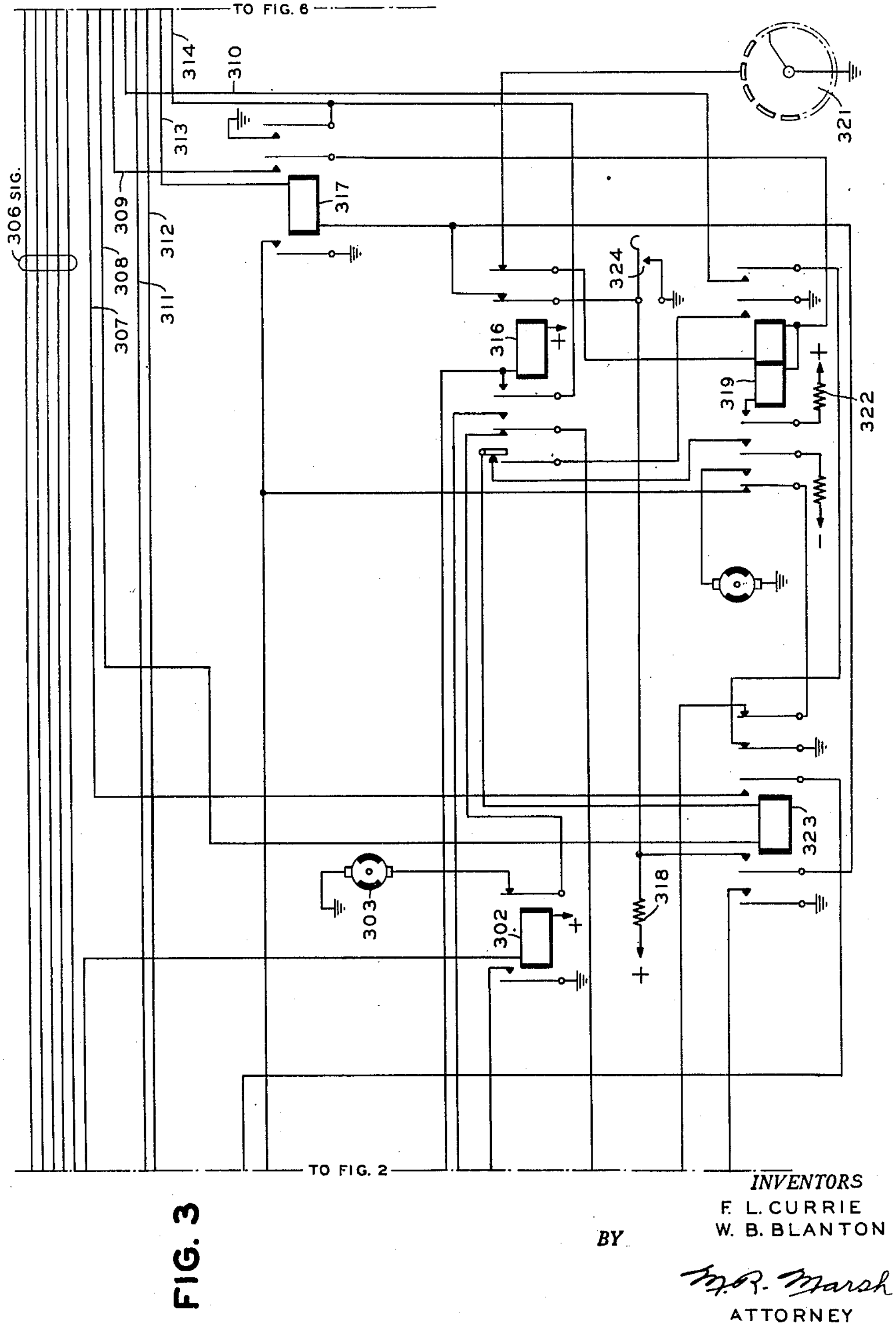

Each receiving position such as that of Figs. 2 and 3 is connected to its associated turret by some thirteen conductors. The first five of these conductors are indicated by reference numeral 306 and are so-called signal conductors in that they serve to transmit the intelligence impulses from the tape transmitter 202. The next or sixth conductor 307 is referred to as the sixth pulse or transmitter step circuit. The seventh, indicated by reference numeral 308, is referred to as the private circuit; conductor 309 as the initial seize circuit, conductor 310 as the start circuit, conductor 311 as the transmitter initiate circuit, conductor 312 as the transmitter switching or operate lamp circuit, conductor 313 as the disconnect circuit, and conductor 314 as the holding circuit.

Figure 6:
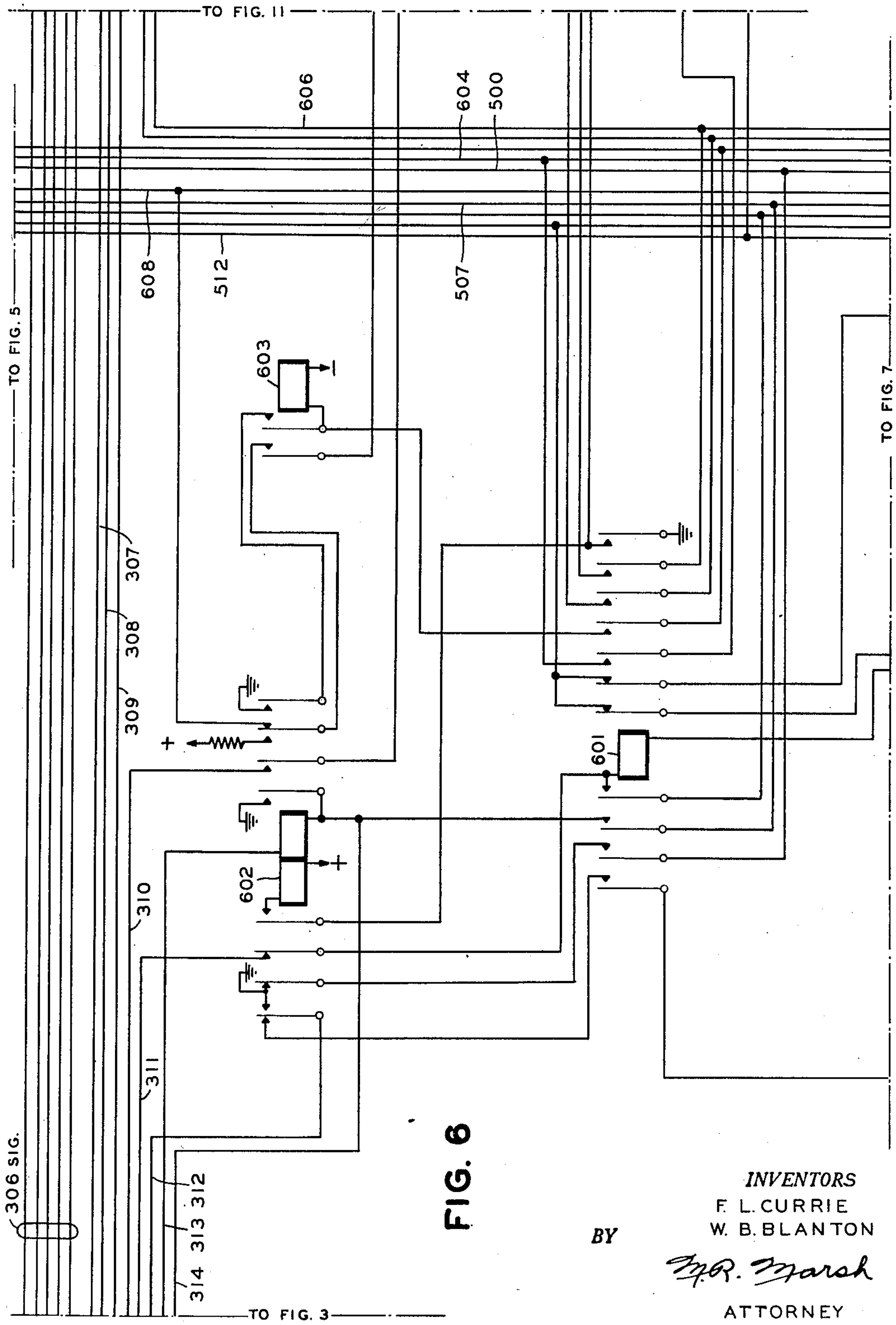
Figure 7:
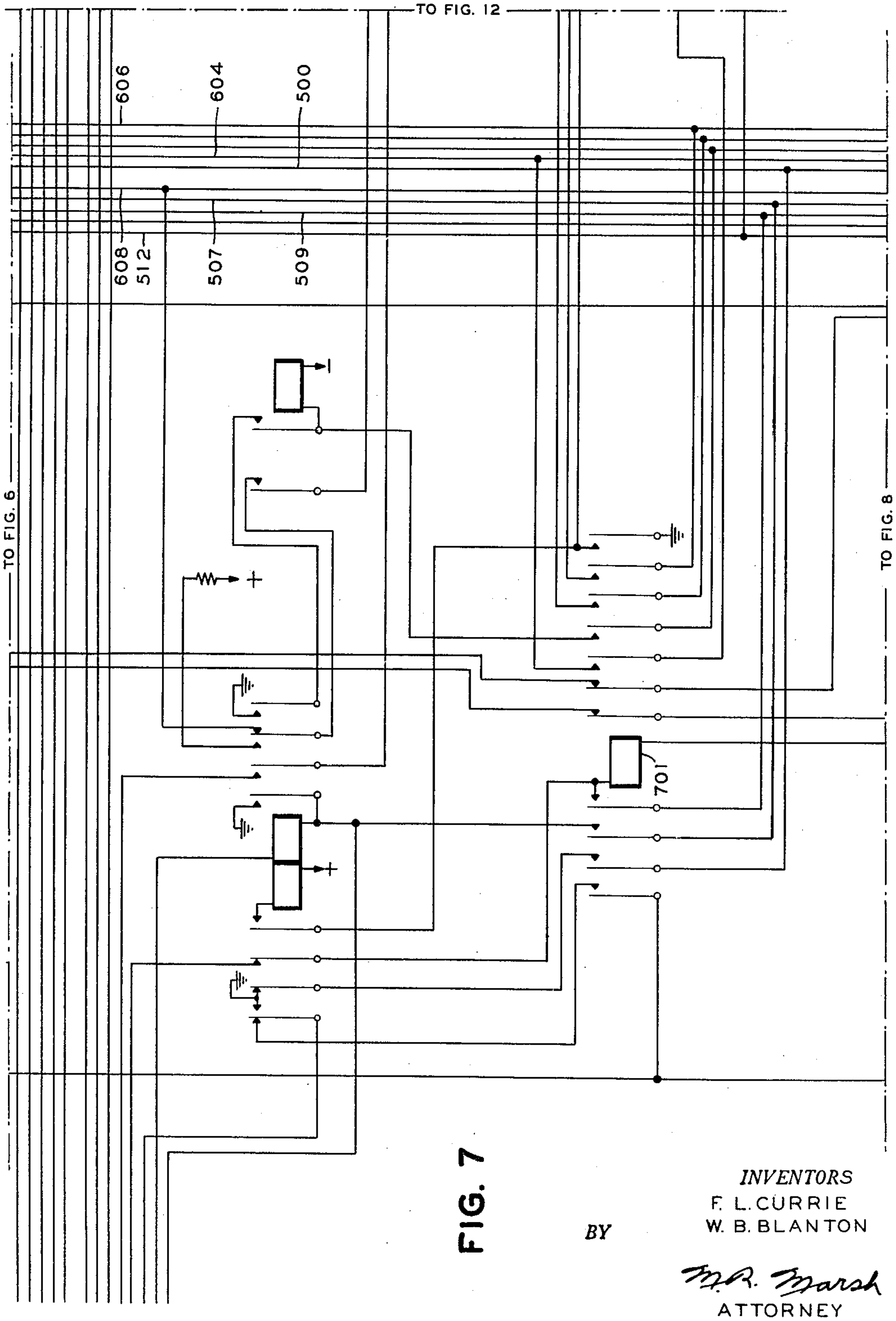
Figure 8:
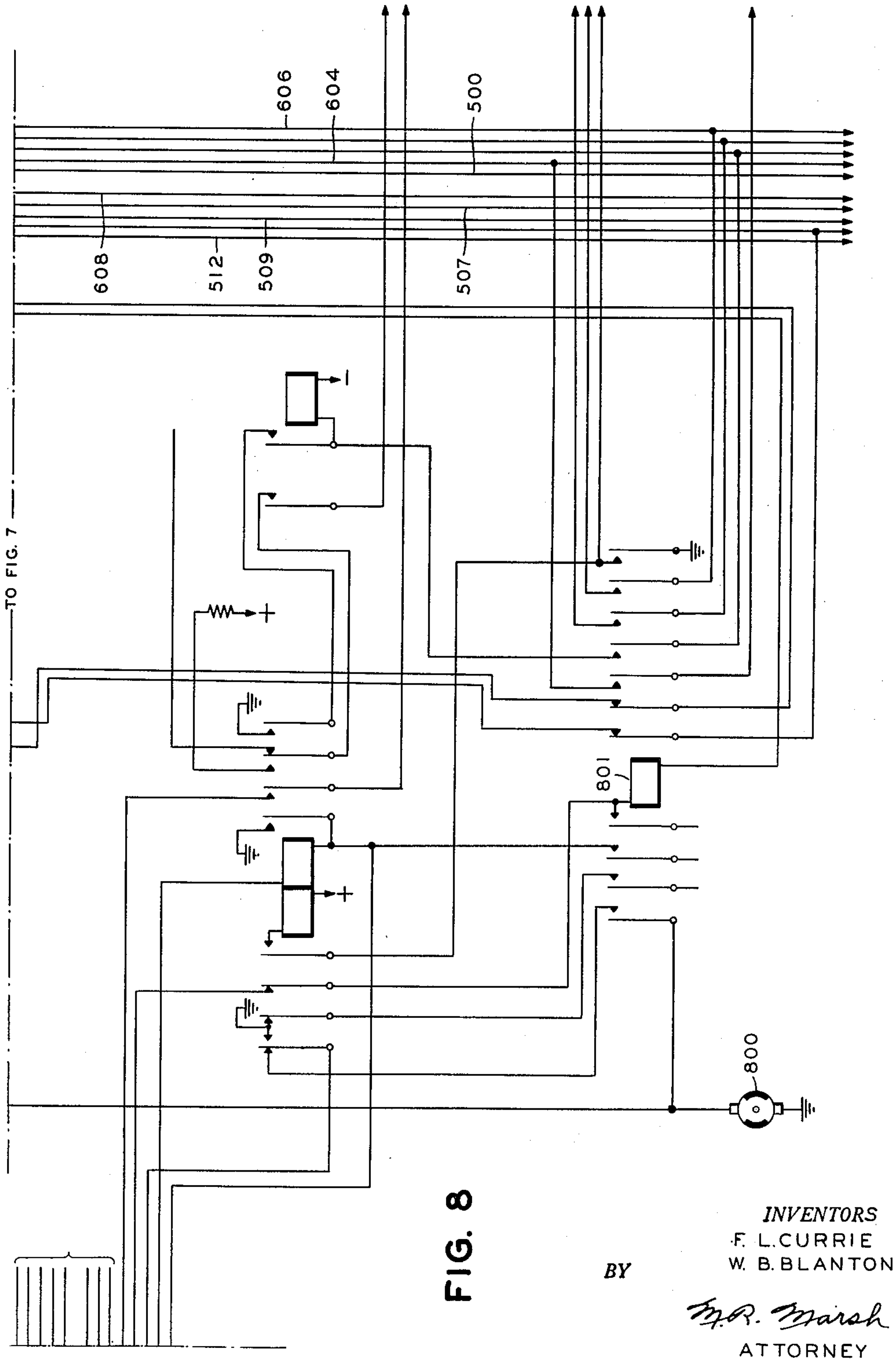

It will be assumed that the receiving position or intra-office transmitter circuit of Figs. 2 and 3 is connected to or associated with the turret section of Fig. 6 and after the operation of relay 302 the attendant depresses the transmitter initiate push button 212. The operation of this push button seizes the common switching equipment in the associated turret and conditions it to respond to the operation of a destination push button. This consists primarily in the operation of a so-called receiving transmitter relay 601 in the associated turret section. The operating circuit of relay 601 extends through back contacts of similar relays such as 701 and 801 in the other sections of the turret connector and the operating circuits for each of these relays extends through back contacts of each of the others. This arrangement prevents more than one receiving transmitter relay in the turret group from operating at any one time and is essential to insure against misdirecting of messages. The circuit for operating relay 601 extends from ground through the left hand tongue and front contact of relay 302, the contacts of the transmitter initiate push button 212, conductor 311, the back contact and second left hand tongue of associated receiving position cut-off relay 602, the coil of relay 601, and back contacts of relays such as 701 and 801 to battery.

The operation of relay 601 opens the operating circuits for other similar relays in associated sections of the turret connector and through its inner left hand tongue prepares a circuit for locking itself operated so that the transmitter initiate push button can be released without effecting release of relay 601.

Other functions performed by the operation of relay 601 include: the preparation of cut-off circuits for associated direct connector and direct selector rotary switches; the completion of a circuit for flashing the transmitter switching or operate lamps 213 in the associated receiving position; the preparation of a circuit for operating the receiving sharing relay 603 in the event that the common sharing connector is to be used; the preparation of the step magnet circuit for the four rotary switches individual to this or included in this section of the connector through operation of relay 1102; and the completion of a circuit for the operation of the so-called direct common relay 501.

The circuit for operating relay 501 extends from ground at the third left hand tongue and back contact of relay 602, the third left hand tongue and back contact of relay 601, conductor 500 and the winding of relay 501 to battery. The circuit for the transmitter switching lamp 213 extends from ground through a circuit interrupter 300, the outer left hand tongue and front contact of relay 601, the back contact and outer left hand tongue of relay 602, conductor 312, and through the lamp 213 to battery.

The direct common relay 501 is operated each time a receiving position transmitter relay such as 601, 701 or 801 associated in the same turret is operated and performs the same functions each time. These functions include: the preparation of a circuit for holding relay 502 operated and for operating relay 503; the connection of potential to the left hand coil of relay 502 in parallel with the coil of relay 503 for decreasing the time of energization of that coil to insure against relay 502 releasing and causing the rotary switch step magnets to operate again; closing the circuit to the turret switching lamp 401, causing it to glow; preparing a circuit for operation of the direct sharing seize relay 1301 in the event that a push button representing a destination served through the sharing connector is depressed; preparing a circuit for the rotary switch step magnets; and preparing a locking circuit for relay 501. Since the circuits fully completed or merely prepared by the operation of the circuit common relay 501 are not extensive and easily traced, and are referred to hereinafter in more detail, the specific tongues and contacts involved will not be recited at this time.

At this time the receiving position transmitter relay 601, relay 1102 and the direct common relay 501 are operated, the turret switching lamp 401 is glowing and the transmitter operate or switching lamp 213 is flashing, and the circuits are now in readiness for the operation of a destination push button.

*Destination push buttons*

As specifically indicated in the drawings, the system is shown and described as capable of switching a message to any one of some 270 destinations and it would be obvious that the principles of the system are applicable to switching centers having a smaller or larger number of destinations associated therewith or circuits extending therefrom. There is a separate destination push button for each destination to which a message may be switched and Figs. 4 and 9 indicate the arrangement of these push buttons and the circuits thereto at a turret, it being understood that each turret has a similar arrangement of push buttons. In the described arrangement, the push buttons are divided into 9 groups of twenty-five each, one group of twenty-three, and one group of twenty-two push buttons. These groups are referred to as group A, B, C, D, E, F, G, H, J, K and M and the first ten groups A to H represent destinations reached through the sharing connector. Groups J and K of twenty-five push buttons each and group M having twenty-two push buttons represent the so-called directly associated sending circuits.

*Operation of destination push buttons group J*

The operation of the various involved elements of the turret connector will now be described in connection with the relaying or intra-office transmission of a message to a destination represented by one of the push buttons in the J group. In this connection let it be assumed that the attendant depresses the J—1 destination push button and this is done after the operation of the transmitter initiate key such as 212 of the transmitter from which the message is to be switched. As will be noted in Figs. 4 and 9, all the push buttons in the J group have one spring of their upper pair of contacts grounded and the operation of any one of these push buttons extends to ground over conductor 403 through the coil of relay 1003, the second right hand tongue and back contact of relay 1004 and the fourth left hand tongue and back contact of the direct sharing seize relay 1301 to potential whereby relay 1003 is operated.

Through its lower set of contacts the operation of the J—1 destination push button applies a ground through one of the conductors of cable 902 to the corresponding point on the lower or marking level of the so-called A direct connector switch 1106. Thus a point on the marking level of this switch is marked and in this instance it will be the No. 1 point. Incidently the same point on the so-called B direct connector switch 1401 is simultaneously marked but the marking thereof performs no useful function at this time.

The operation of relay 1003 by the above-described circuit performs a number of functions which includes: the completion of a circuit for the operation of relay 504; the partial preparation of the step magnet circuit of the A direct connector switch 1106; opening of a ground connection through contacts of relay 506 so that relay 602 can not be operated until both relays 506 and 503 are operated; the marking of the twenty-fifth point on the lower or marking level of the direct selector rotary switch 1101, the corresponding points of the other levels of which are connected to the top nine wipers of rotary switch 1106; prepares the switch step magnet cut-off circuit for holding relay 502 operated and to operate relay 503 when the wipers of rotary switch 1106 reach their marked point; and opens the operating circuits for the coils of relays 1004 and 1301 to insure that during the stepping of the A direct connector switch 1106 neither the B direct connector switch 1401 nor any of the rotary switches in the sharing connector can be conditioned for operation. The circuit for the operation of relay 504 may be traced from ground through the second left hand tongue and front contact of relay 1003, the front contact and outer right hand tongue of relay 501 and the coil of relay 504 to potential.

Relay 504, the so-called direct relay No. 1, controls the battery and ground connections for all the A and B direct connector switches, the direct selector switches, and hereinafter described sharing selector switches associated with the same turret. This relay is slow to operate and this characteristic insures that relays 502, 1002, 503 and 506 associated with various ones of the rotary switches will have time to operate before the step magnets of the rotary switches can energize when the wipers thereof are already resting on a marked point. More specifically the operation of relay 504 connects battery to the step magnets of the direct selector switch 1101, the A and B direct connector switches 1106 and 1401, and the sharing selector switch 1402 causing the direct selector switch and the direct connector switch step magnets to be energized; completes a locking circuit for relay 601; prepares a locking circuit for relays 502 and 503 which is completed when these relays operate; and prepares a locking circuit for itself when a destination push button is depressed. The circuit for holding relay 601 operated includes the front contact and inner right hand tongue of relay 504, conductor 509, the left hand tongue and front contact and winding of relay 601, and back contacts of relays 701 and 801 to potential. The circuit for the step magnet SM of rotary switch 1101 extends from ground at the right hand tongue and back contact of relay 511, the front contact and inner right hand tongue of relay 501, conductor 512, the inner tongue of relay 1102, the coil of step magnet SM of rotary switch 1101, conductor 1107, the tongue and back contact of relay 1002 and the back contact and outer left hand tongue of relay 504 to potential. The circuit to the step magnet SM of rotary switch 1106 extends from ground at the right hand tongue of relay 511 over a part of the above-described circuit, through the front contact and second tongue of relay 1102, the coil SM of step magnet of rotary switch 1106, conductor 1108, the inner right hand tongue and front contact of relay 1003, conductor 1008, the back contact and tongue of relay 502 and the front contact and second left hand tongue of relay 504 to potential. The step magnets SM of rotary switches 1101 and 1106 will be energized at approximately the same time and both rotary switches will start stepping and continue to step until their wipers reach their respectively marked points. Each switch will stop stepping when its marked point is reached and either may reach that point first.

Each time the step magnet SM of rotary switch 1101 is energized, the associated interrupter contact completes a circuit from ground over conductor 1109 through the right hand coil of relay 1002 to potential whereby the said relay is operated. This relay in operating interrupts the step magnet circuit whereupon the step magnet releases and effects advancement of the wipers of switch 1101 to the next point, and the opening of the interrupter contacts at this time interrupts the circuit through the right hand coil of relay 1002 which releases and again completes the circuit to the step magnet. This operation and release of step magnet SM and of relay 1002 continue until the wipers of switch 1101 reach the marked or grounded point on the lower level thereof at which time a circuit is completed from ground at this marked point, which for the assumed condition is the 25th point, over conductor 1111, the third right hand tongue and front contact of relay 601, conductor 604, the left hand coil of relay 1002, and the coil of relay 506 to potential. This circuit holds relay 1002 operated so that the circuit to the step magnet SM can not be reestablished, and effects operation of relay 506.

In a similar manner the interrupter contacts associated with the step magnet SM of relay 1106, in conjunction with the operation and release of relay 502 effects stepping of the wipers of this switch until the marked point on the lower or marking level is reached. At this time a circuit is completed from ground at the marked point through the front contact and sixth right hand tongue of relay 601, conductor 606, the inner left hand tongue and front contact of relay 1003, the third right hand tongue and front contact of relay 501, the left hand coil of relay 502, and the coil of relay 503 to potential. This circuit holds relay 502 operated to prevent reestablishment of the circuit through the step magnet SM and effects operation of relay 503.

When relays 502 and 1002 are operated, they must be held in their operated condition to prevent reestablishment of the step magnet circuits controlled thereby and the possible stepping of the wipers off the marked points. In this respect the wipers of the marking levels of these switches are bridging wipers so that the circuit through the left hand windings of these relays 502 and 1002 are completed as soon as possible when the step magnets release.

The operation of relay 506 in connection with the stepping of the wipers of rotary switch 1101 to the points corresponding to the point marked on the lower level partially prepares a circuit for the operation of relay 602, and the operation of relay 503 in connection with the stepping of the wipers of rotary switch 1106 to the points corresponding to the point marked on the lower level prepares a locking circuit for itself and relay 502. Relay 502 is a slow-to-release relay which characteristic is useful when establishing transmission paths through the sharing connector hereinafter described. Relay 502 in operating also completes a circuit for operating relays 602 and 317, and establishes another circuit to ground for locking relay 601 operated.

The circuit for operating relays 602 and 317 may be traced from ground at the back contact and outer left hand tongue of relay 1301, conductor 1302, the inner right hand tongue and front contact of relay 503, the front contact and tongue of relay 506, conductor 507, the second left hand tongue and front contact of relay 601, the right hand coil of relay 602, conductor 313, the coil of relay 317 of the intra-office transmitter circuit, the back contact and inner right hand tongue of relay 316, and through a resistance 318 to potential.

The operation of the receiving position cut-off relay 602 through its third left hand tongue interrupts the operating circuit of relay 501 whereupon the latter releases; through its second left hand tongue it opens transmitter initiate circuit including conductor 311 so that the associated receiving position transmitter relay 601 can not be reoperated by operation of its associated transmitter initiate push button while relay 602 is operated; transfers the transmitter operating lamp circuit 312 from the interrupter 800 to a steady ground at the make contact of its outer left hand tongue whereby the lamp ceases to flash and glows steadily; through its inner right hand tongue it locks itself and relay 317 operated by a circuit including conductor 313; closes another locking circuit through its left hand winding which is maintained as long as the destination push button is held depressed; and through its second right hand tongue and front contact closes the start circuit 310. The other tongues of relay 602 control circuits which are obvious or perform functions only when a switching operation is being made through the sharing connector, and since the operation being described is to a direct sending circuit, they perform no useful function at this time.

The release of relay 501 causes the turret switching lamp 401 to be extinguished and thereby inform the attendant that the switching operation is completed and that the depressed destination push button, which in this case is the No. 1 in the J group, may be released; and returns all the other circuits involving contacts of this relay to their normal condition.

In this manner the intra-office transmitter circuit is connected to the intra-office path selected by the operated destination push button, the transmitter operating lamp 213 has changed from flashing to a steady glow, and the turret switching lamp has been extinguished to inform the attendant that the destination push button may be released. The release of the push button effects release of relays 504, 1002, 506, 1102, and 601. Relays 602 and 317 remain operated until the end of the message.

Figure 21:
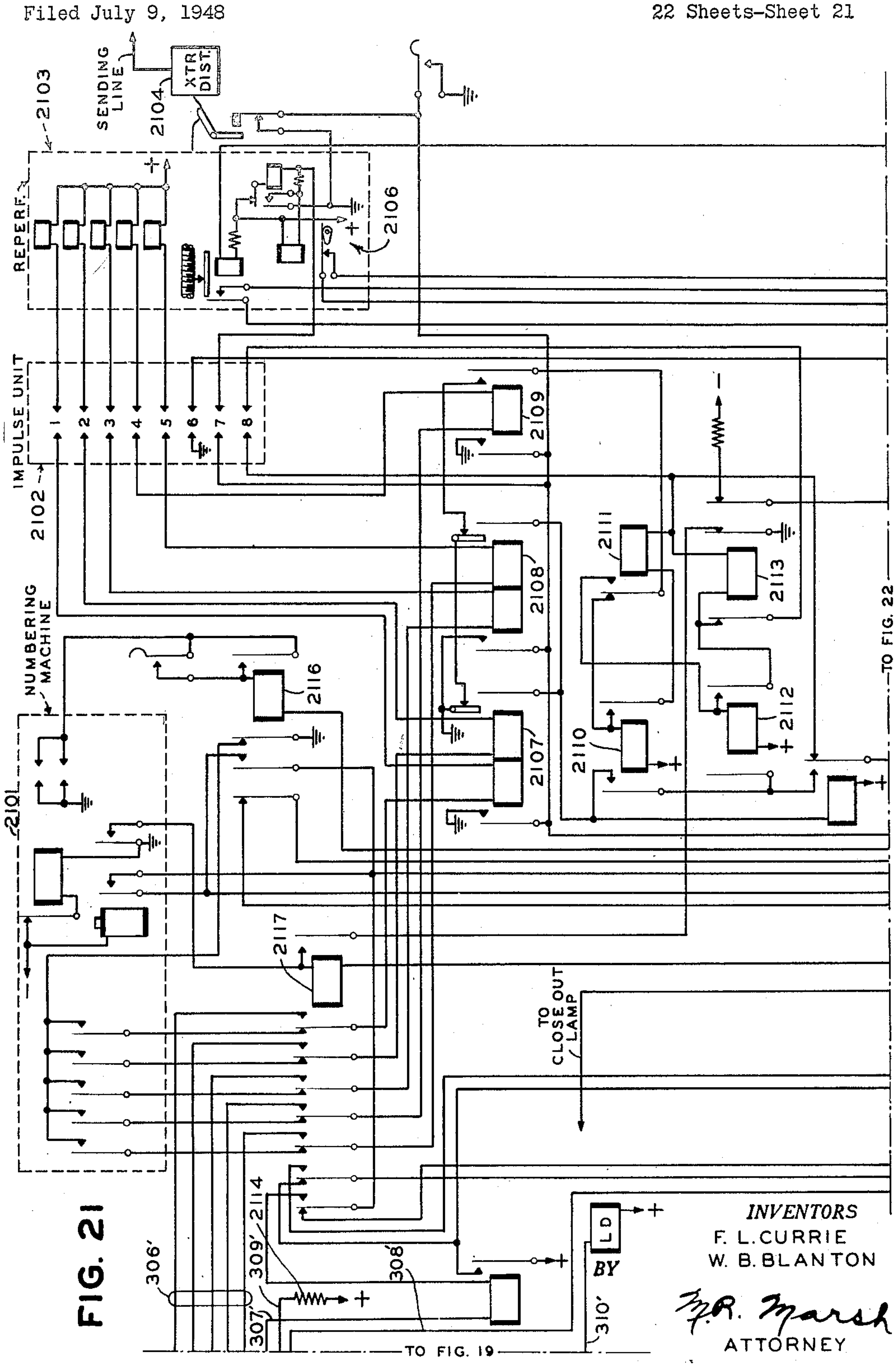
Figs. 21 and 22 are details of a so-called sending circuit or sending position employed to control the transmission of message signals to an outgoing line.
Figure 22:
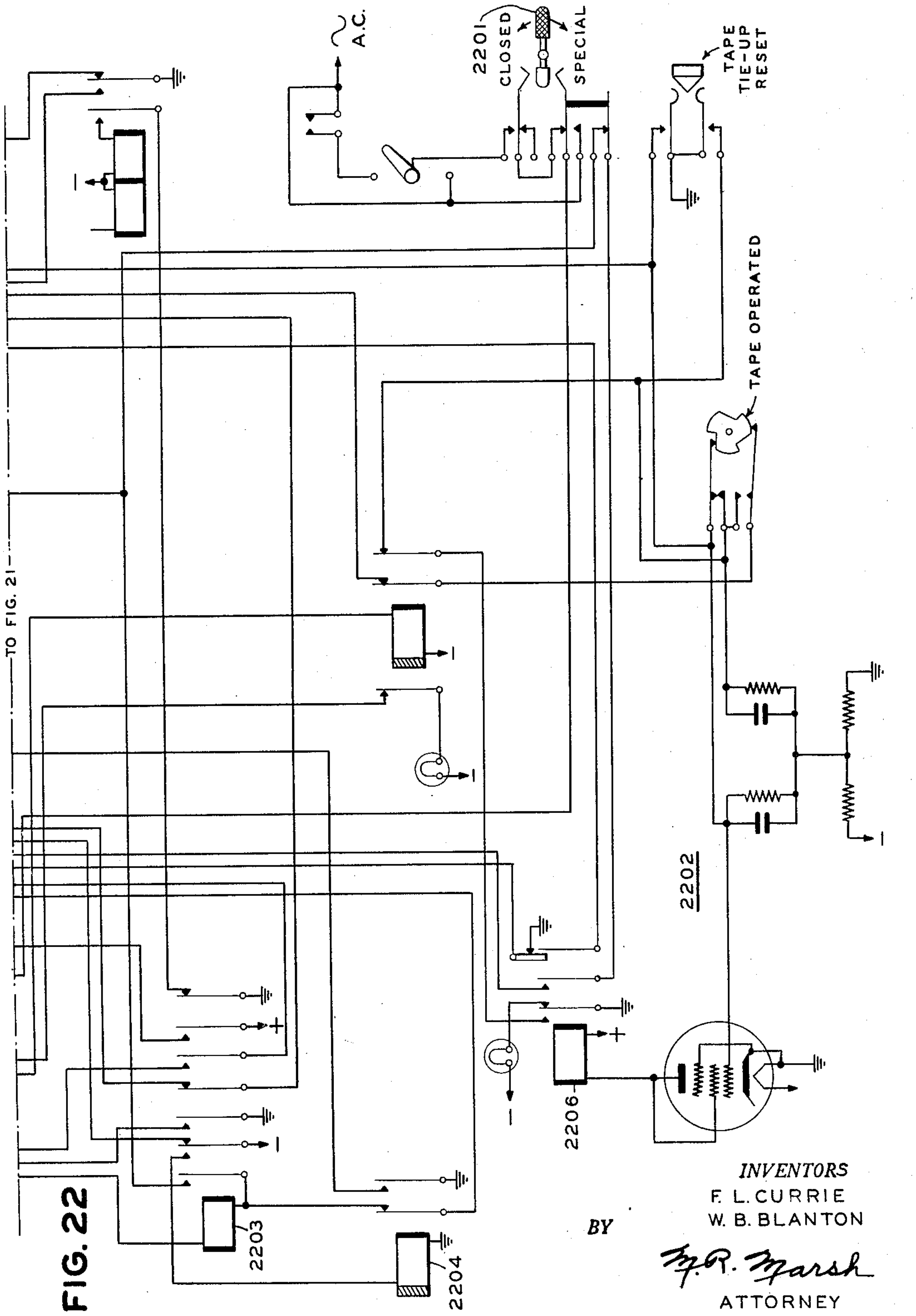

At this time the switching operation at the turret is complete with the wipers of the direct selector rotary switch 1101 resting on their marked or 25th point and the wipers of the direct connector switch 1106 resting on their first point. Each set of nine points, one from each of the upper nine levels of switch 1106, is connected by cable 1114 to a sending circuit or position, and for the time being it will be assumed that the sending circuit of Figs. 21 and 22 is the one connected to the first set of points of rotary switch 1106. The circuits of the first eight conductors from a receiving position to a sending position were completed when switches 1101 and 1106 reached their marked points, and the ninth or start circuit was completed when relay 602 operated.

*The sending circuit*

Each outgoing line or channel from the switching office has a so-called sending circuit or position associated therewith, such as that of Figs. 21 and 22. The essential function of such a circuit is to receive the message transmitted over the intra-office path and store the same in a perforated tape which is subsequently employed to control a line sending transmitter.

Included in the equipment of the sending circuit is a numbering machine 2101, an impulse unit 2102, a reperforator 2103 and the line sending tape transmitter 2104. In the preferred arrangement, the sending circuit also includes an automatic tape feed-out device 2106 for feeding sufficient blank tape out of the reperforator 2103 to enable the last message character in the tape to reach the tape transmitter 2104.

A close-out key such as 2201 may also be provided to close out the sending circuit as, for example, when the office at the distant end of the associated sending line is closed down. Also, a tape tie-up indicating arrangement 2202 may be provided which functions to appraise the attendant of the failure of the tape from the reperforator 2103 to advance properly. In addition to the above, the sending circuit includes a set of three impulse relays 2107, 2108 and 2109 which operate in conjunction with a set of counting relays 2110, 2111, 2112 and 2113 to detect an end-of-message signal transmitted from the receiving position and initiate at such times the disconnection function. The end-of-message signal employed in the system of the present arrangement is a double period or two characters wherein the fourth pulse only is marking.

*Initiating transmission from the intra-office circuit*

The operation of relay 317, as set forth above, when the desired intra-office transmission path has been established closes the initial seize circuit 309. This circuit is provided for indicating whether an intra-office circuit is busy and is so arranged that there is substantially zero potential at the point where a second receiving position would be connected to a busy intra-office circuit. At the sending circuit the initial seize circuit extends through resistance 2114 to negative potential and at the receiving position through front contacts of relay 317 and the right hand coil of relay 319, back contacts of relays 316 to a point on the transmitter allotter 321. If the equipment of the sending circuit desired is not busy, the grounding of the initial seize circuit by the transmitter allotter 321 operates relay 319 which locks up to positive battery through its left hand coil. The locking circuit including resistance 322 is so arranged with respect to resistance 2114 that the potential at the center of the circuit is substantially zero and thereby prevents relays such as 317 of other transmitter circuits from operating when their associated receiving positions are seeking a connection to the same sending position.

Relay 319 in operating closes the private circuit 308 through the coils of the seize relays 323 in the receiving position and 2203 in the sending position. Relay 323 performs the following functions: opens the circuit of the standby lamp 214 to indicate that a connection has been made to the sending circuit; prepares a circuit for the sixth or transmitter step pulse from the impulse unit 2102; prepares a ground to serve as a locking circuit for relays 211 and 216; and shunts contacts of the first right hand tongue of subsequently operated relay 316.

At the sending position, operation if relay 2203 shunts a part of the private circuit making it independent of contacts of relays 2204, 2116, 2206 and the close-out key 2201, further opens the circuit to relay 2116 so that it can not be operated while the perforator is in use, completes a circuit for operating relay 2204, prepares a circuit for operating the transfer relay 2117 and conditions the tape tie-up unit 2202. Relay 2203 also initiates operation of the numbering machine 2101 into a cycle of operation wherein the message sequence number along with certain other information is transmitted to the reperforator 2103 and perforated in the tape ahead of the message subsequently transmitted to the reperforator. At the end of the cycle of the numbering machine 2101, relay 2117 operates and extends the five signal conductors 306' through contacts of the impulse unit 2102 to the reperforator 2103 and also extends the sixth pulse conductor 307' to the sixth pulse contacts. Accordingly, the reperforator 2103 is conditioned to perforate the message signals received over the signal conductors 306' and the step circuit for the transmitter of the receiving position is extended thereto. Further details of the operation of the units and circuits of the sending position such as Figs. 21 and 22 are set forth in copending application Serial No. 240, filed January 2, 1948, wherein a similar sending position is employed.

The first transmitter step pulse received over conductor 307 at the receiving position and extending through front contacts of relay 323, back contacts of relay 211 and the coil of relay 216 operates the latter relay which completes a circuit through both of its coils and the coil of relay 211, back contacts of relay 217 and front contacts of relay 323 to ground. However, relay 211 does not operate until the end of the step pulse since the grounded step pulse short-circuits the coil of relay 211.

The operation of relay 211 at the end of this step pulse switches the five signal conductors 306 to the tongues of the tape transmitter 202 and a subsequent closing of these conductors at the impulse unit 2102 causes the selecting magnets in the reperforator 2103 to be energized in accordance with the markingly positioned tongues of the transmitter. Thus, the first character in the tape 203 is reperforated in the tape of reperforator 2103 and the subsequent closing of the sixth pulse circuit 307', at this time extending over the circuit including the front contact and outer right hand tongue of relay 211, the coil of relay 218 and through parallel circuits each having a coil of relay 219, to the step magnet SM of tape transmitter 202, energizes the step magnet SM. Thus, the step magnet is energized to advance the next perforation in the tape into registry with the sensing pins of tape transmitter 202 and it is subsequently transmitted to the reperforator 2103. In general, the functions of the circuits of Figs. 2 and 3 are substantially similar to those described in greater detail in the above-mentioned application Serial No. 240, filed January 2, 1948.

*End-of-message signal*

When the double period constituting an end-of-message signal is transmitted to the sending position, the receipt of the second period causes operation of relay 2113 which through its outer right hand tongue opens the private circuit 308, 308' and thereby effects release of the seize relays 323 and 2203 as well as the transfer relay 2117. The release of these three relays electrically disconnects the transmitter 202 from the reperforator 2103 and initiates the restoring of the circuits to normal. Relay 323 releases relay 317 which in turn causes relay 319 to release. Relay 323 also releases relay 602 of the turret connector and thus the end-of-message signal initiates a disconnect function wherein the various circuits involved are restored to their normal idle condition.

The circuits of the receiving position as well as those of a sending position function in the manner set forth whenever transmission is established between two such circuits and, accordingly, the description of the operation of these circuits will not be repeated in connection with the description of the establishment of paths through different units of the turret connector or the sharing connector.

*Operation of destination push buttons group K*

The turret connector operates in much the same manner when a push button of the K group is depressed as described above in connection with the operation of J group push buttons. When a K push button is depressed, ground through its upper pair of contacts is applied over conductor 404, through the coil of relay 1004, a back contact of relay 1003 and the fourth left hand tongue and back contact of relay 1301 to potential, instead of through the coil of relay 1003 as is the case when a group J push button is depressed. The operation of relay 1004 functions similarly to relay 1003 to complete a circuit to cause stepping of the wipers of rotary switch 1401 to the marked point. This switch, sometimes called the B direct connector switch, has connected to the points thereof the various sending circuits represented by various ones of the group K destination push buttons.

Relay 1004 in operating marks the twenty-fourth point on the marking level of rotary switch 1101 so that the wipers thereof will stop at this point and extend the circuits of these wipers to corresponding wipers on rotary switch 1401.

*Operation of destination push buttons group M*

In the same manner, the operation of an M group destination push button establishes a transmission path through one of the sets of the first twenty-two points on the levels of the direct selector switch 1101. At such times the point on the lower marking level of switch 1101 is marked directly through the lower sets of push button contacts over a conductor of cable 901 and another ground from the upper contacts of the push button over conductor 402, through contacts of relay 501 and the coil of relay 504 to potential operates the latter relay.

The operation of relay 504 (direct relay No. 1) through its inner right hand tongue supplies a ground for holding the receiving position transmitter relay 601 locked up; through its outer left hand tongue and front contacts it applies potential through a tongue and back contact of relay 1002 to the step magnet SM of rotary switch 1101 causing it to operate; and locks itself operated to the push buttons upper contacts independently of the outer right hand tongue and front contact of relay 501, the latter circuit insures that relay 504 will remain operated after relay 501 releases or as long as the destination push button is held depressed.

The completion of the circuit to the step magnet SM of direct selector switch 1101 initiates it into seeking the grounded point on its lower level and when the marked point is reached, the ground thereon is extended through the associated wiper, conductor 1111, the third right hand tongue and front contact of relay 601, conductor 604, the left hand winding of relay 1002 and the coil of relay 506 to battery. The latter circuit locks relay 1002 in its operated position and effects operation of relay 506. With relay 1002 held operated no further stepping of rotary switch 1101 will occur and with relay 506 operated a circuit is completed for operating the receiving position cut-off relay 602 as well as the transmitter initiate relay 317 in the intraoffice transmitter circuit and thereby complete establishment of the desired transmisison path.

*Establishing transmission path through the sharing connector*

The operation of the sharing connector is quite different from that of a turret connector and since the sharing connector is common to a plurality of turrets, exclusive control thereof must be established when switching through a turret to prevent interference from the other associated turrets. In the arrangement shown the sharing connector provides for the establishment of intraoffice transmission paths to any one of 198 sending positions. These destinations are represented by eight groups of destination push buttons A to G of twenty-five each and group H of twenty-three.

Figure 4:
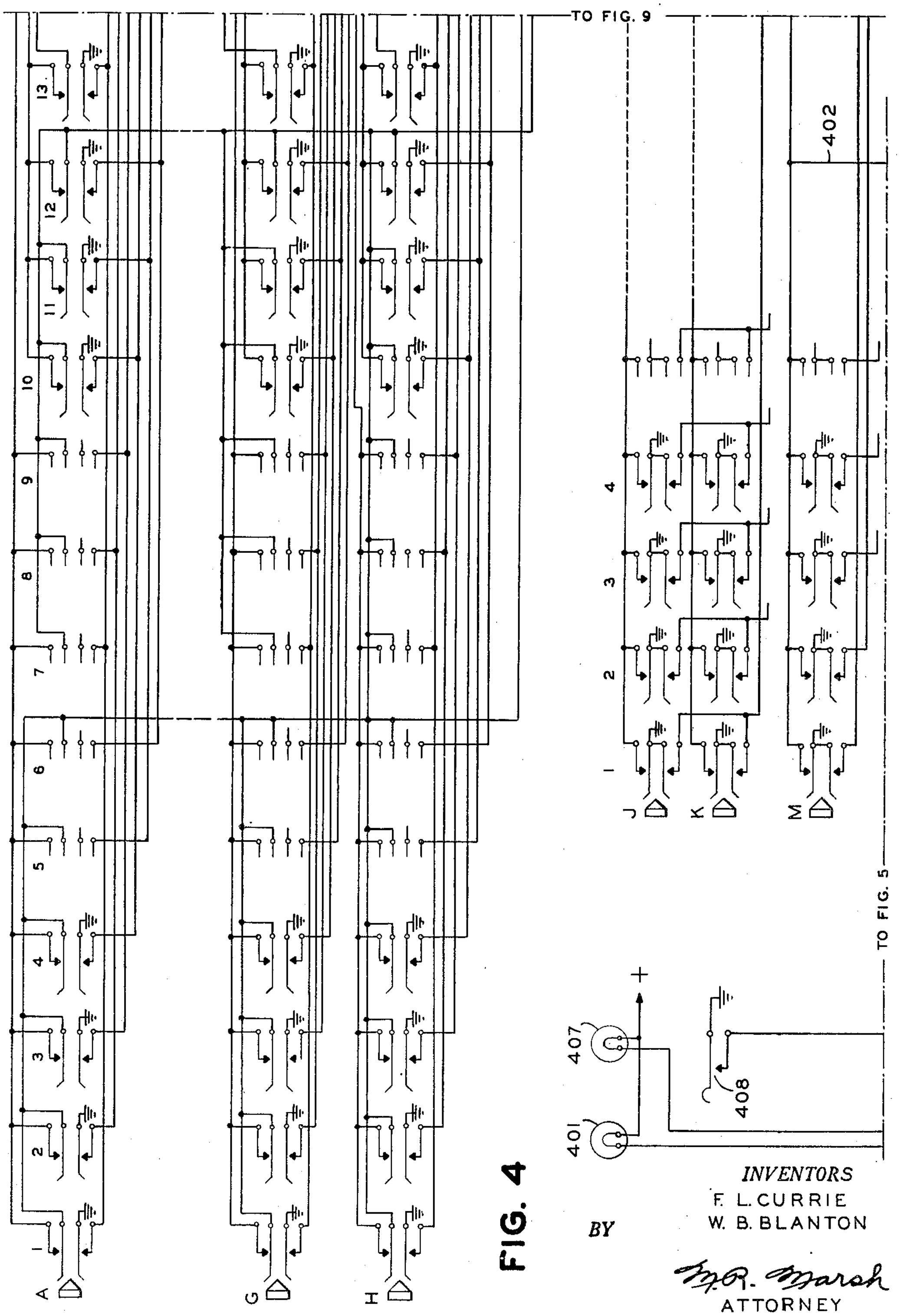
Figs. 4 to 20 are equipment and circuit drawings of a typical exemplary system embodying the various intra-office transmission paths.
Figure 5:
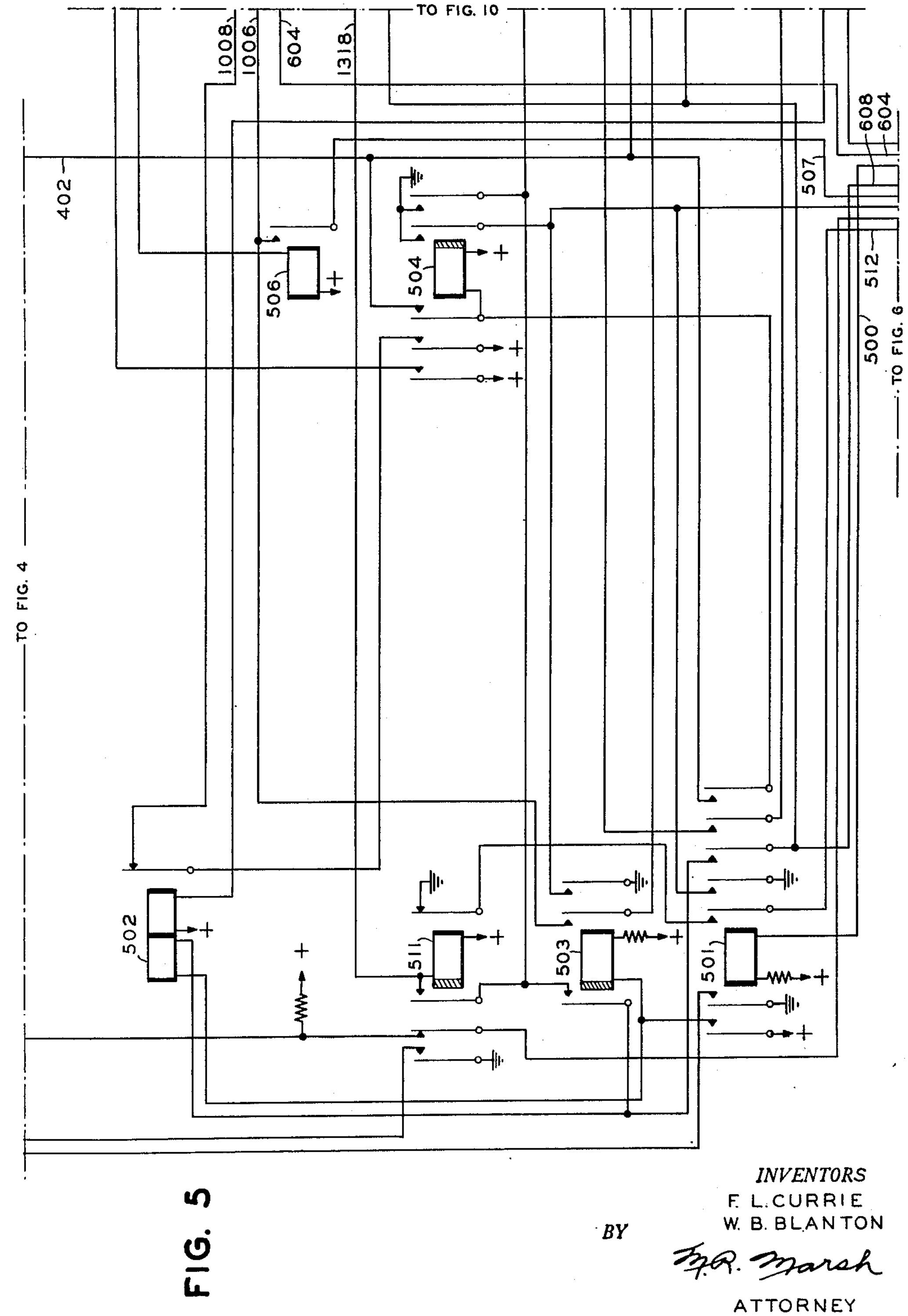
Figure 9:
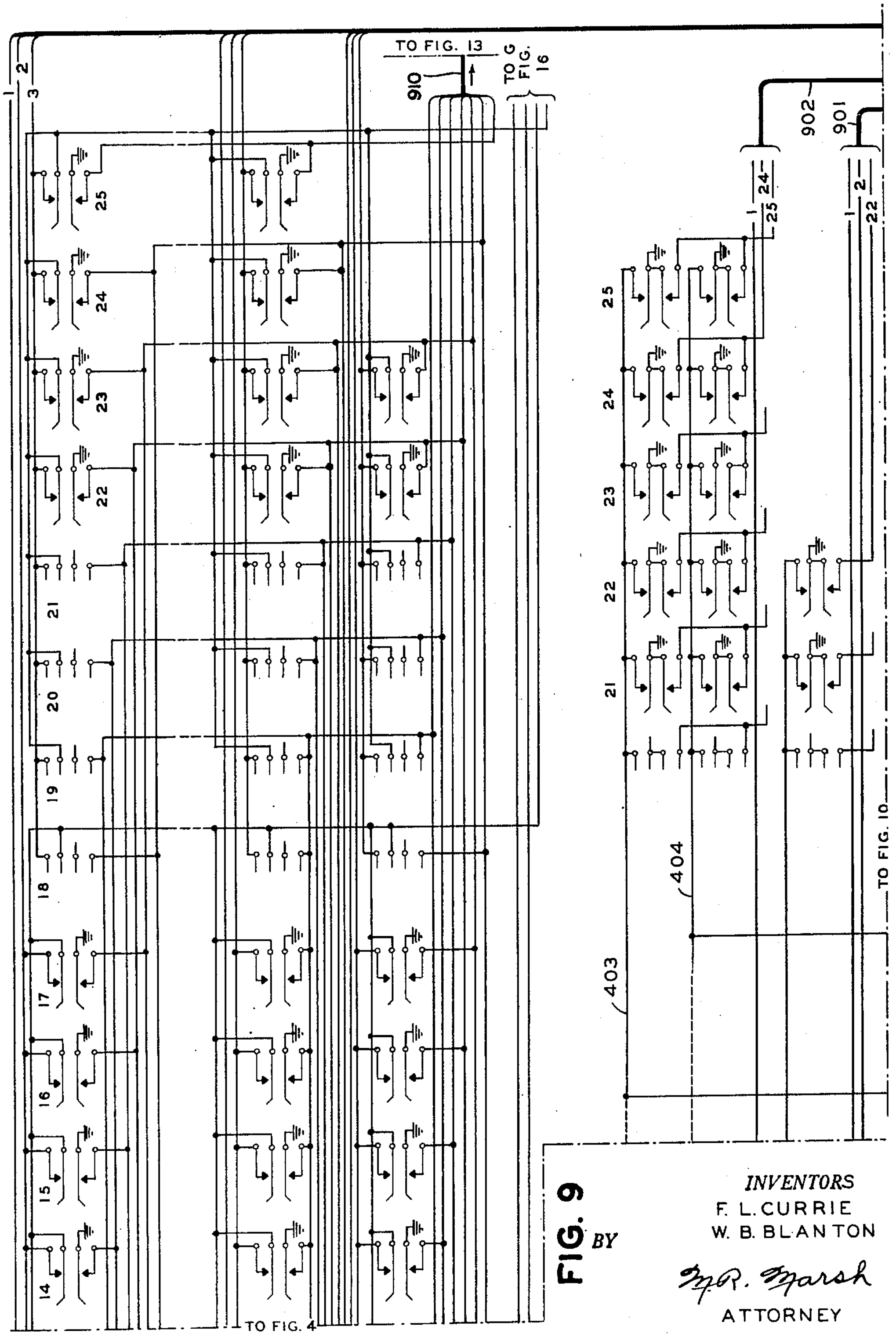
Figure 10:
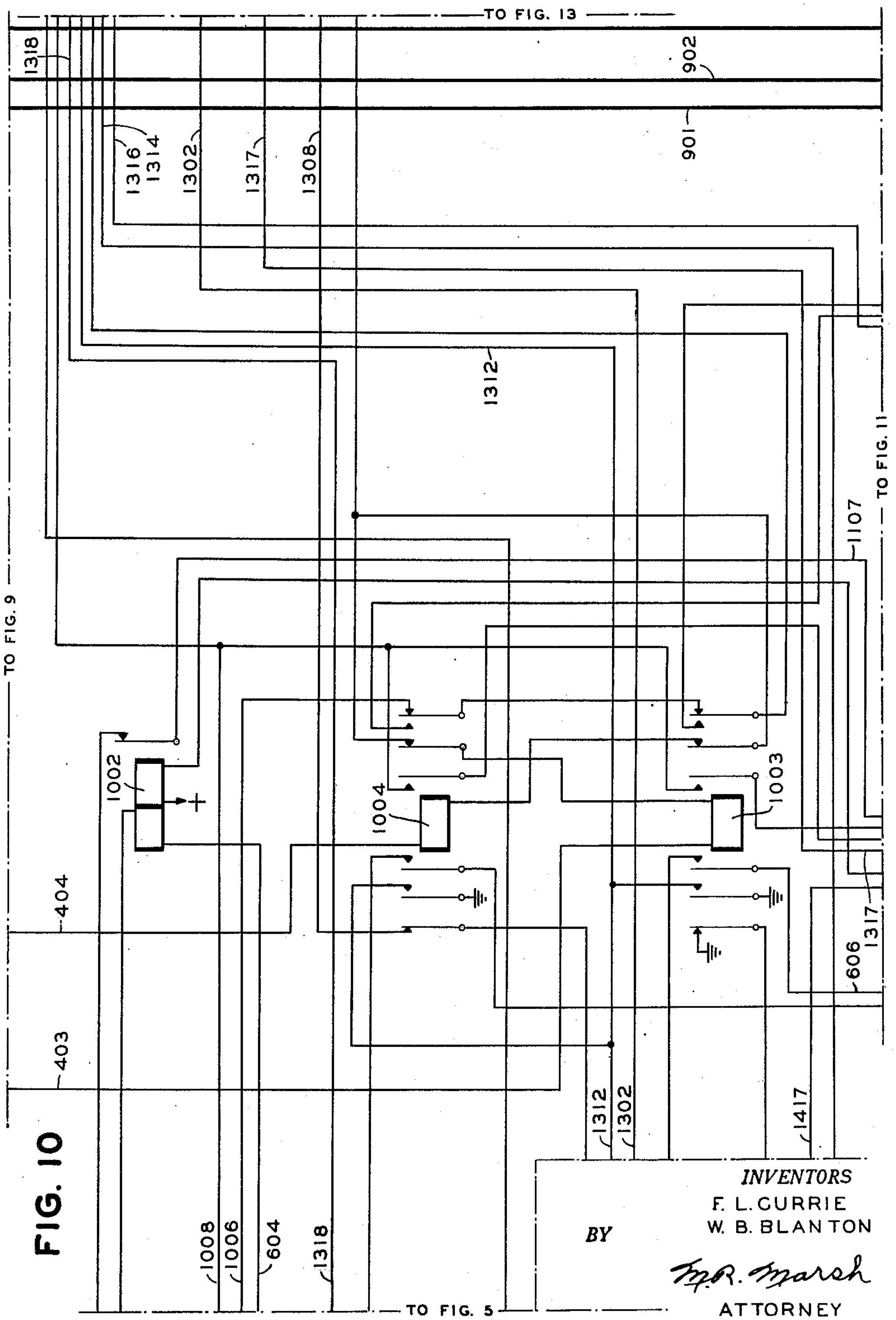
Figure 11:
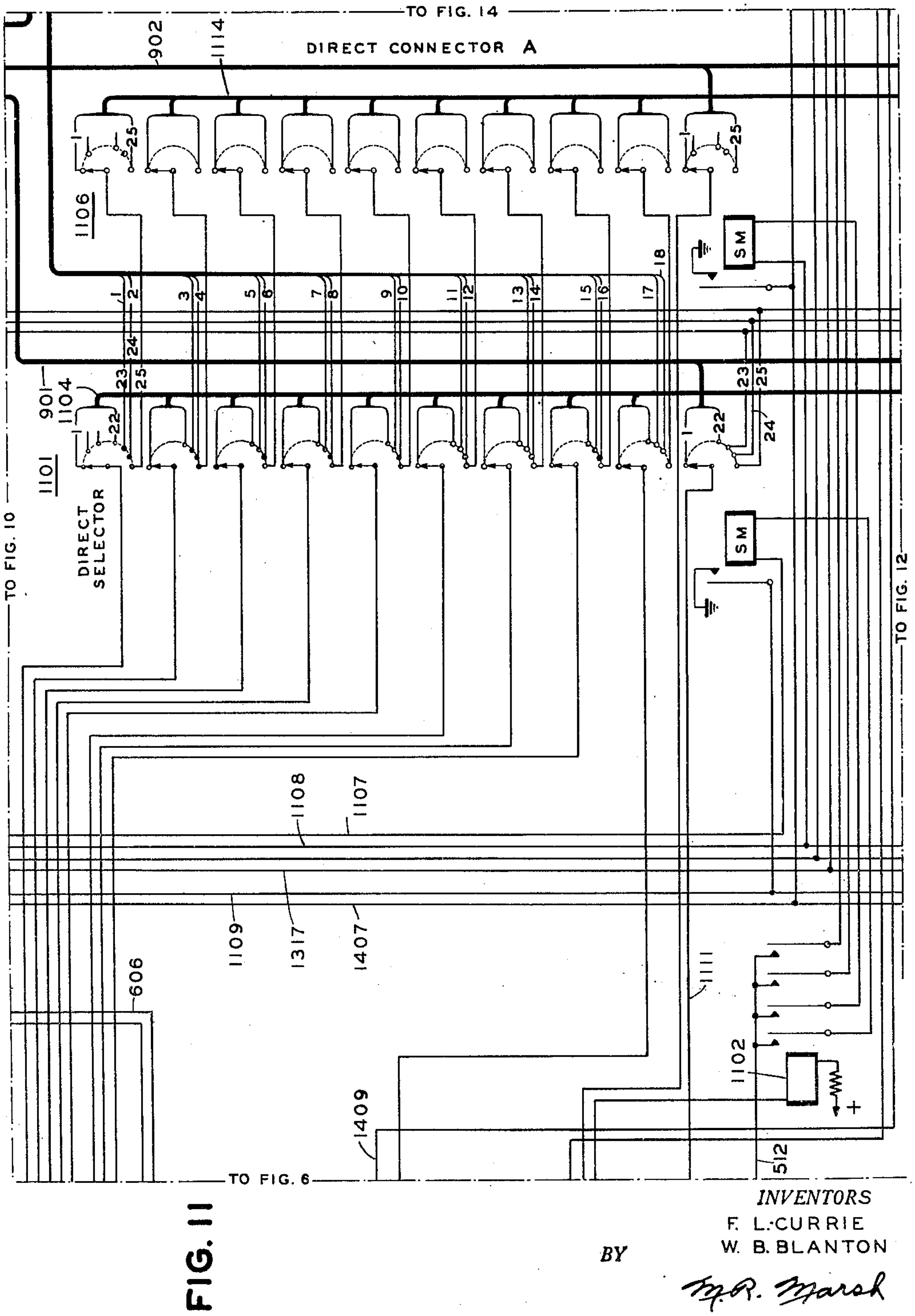
Figure 12:
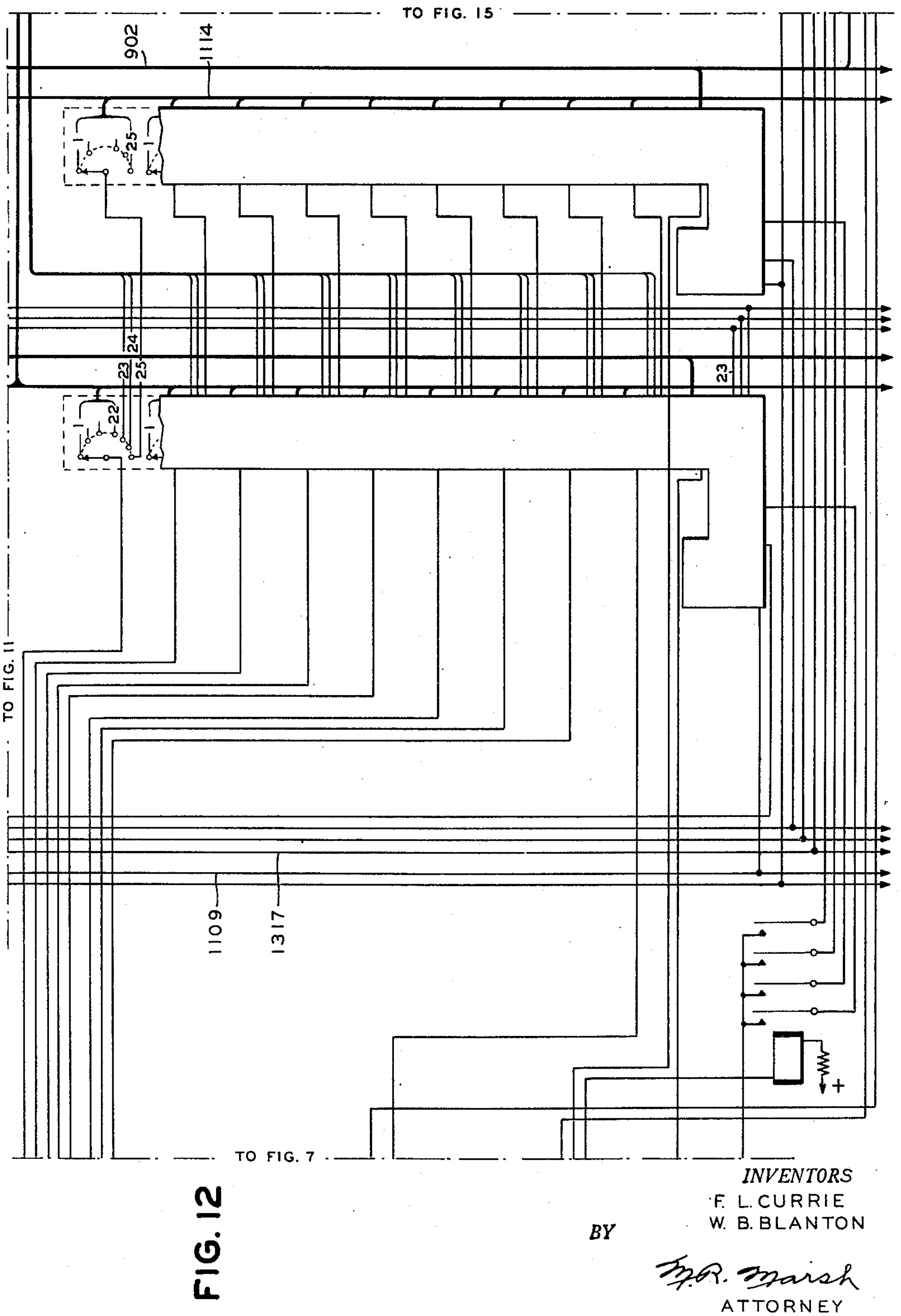
Figure 13:
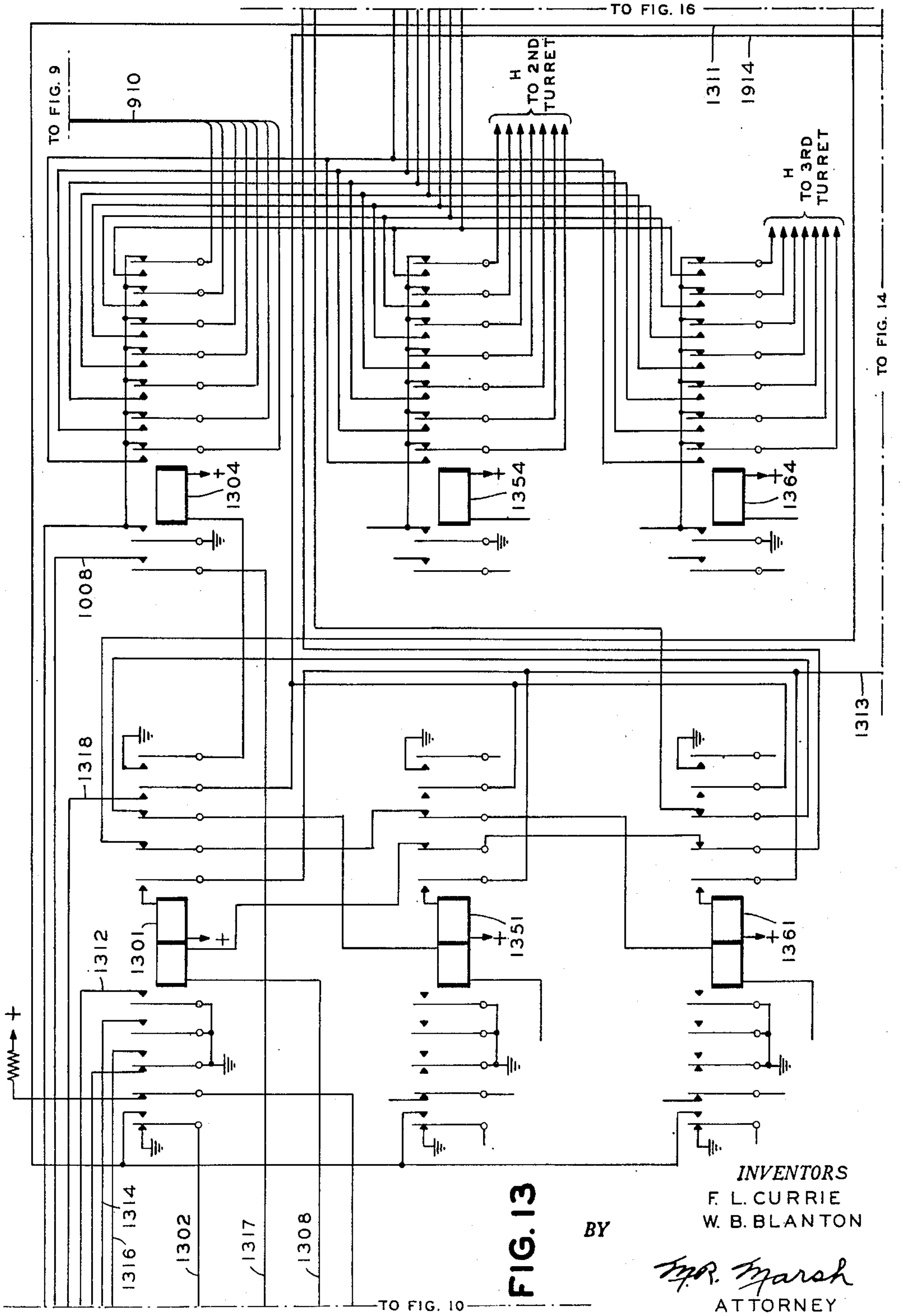
Figure 14:
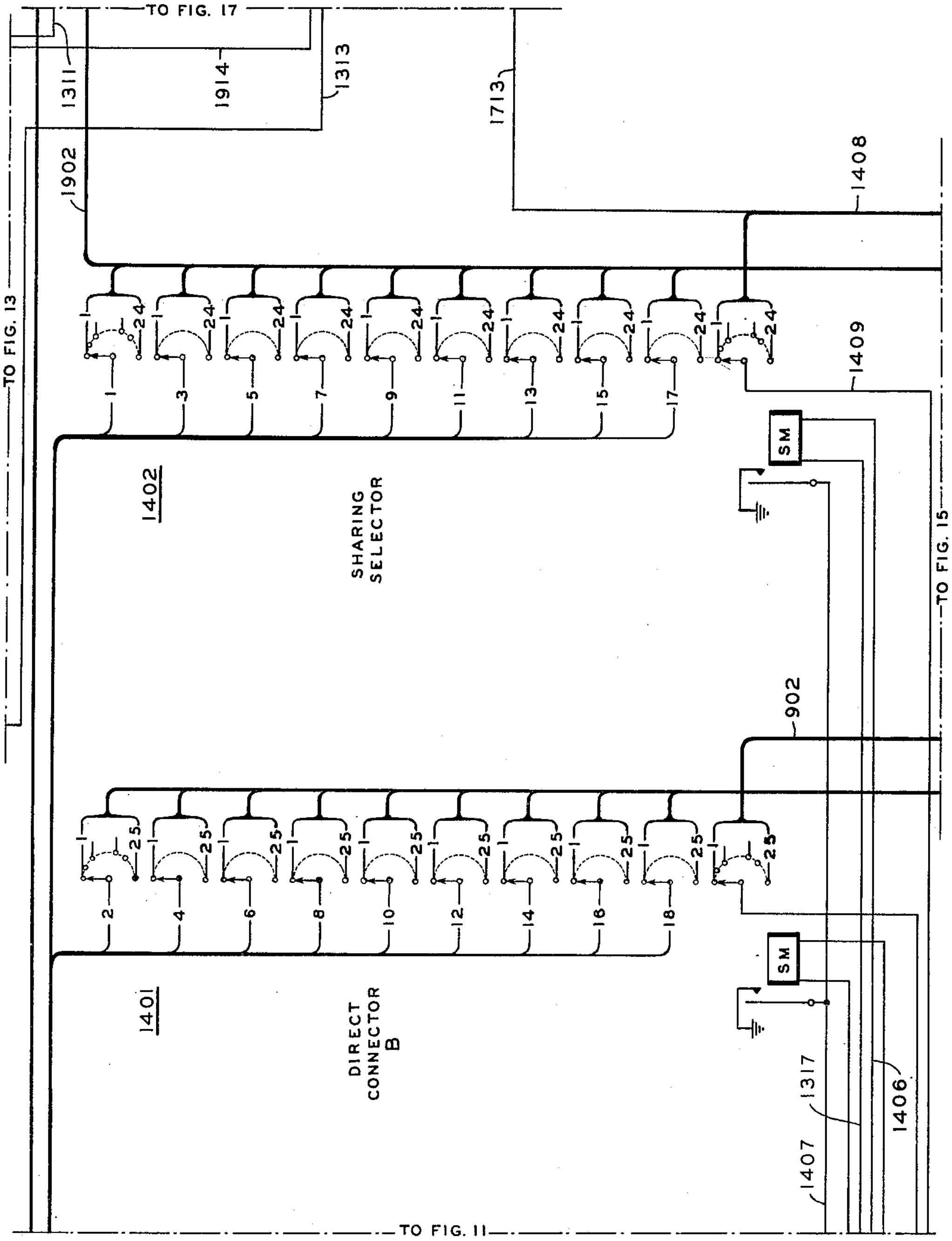
Figure 15:
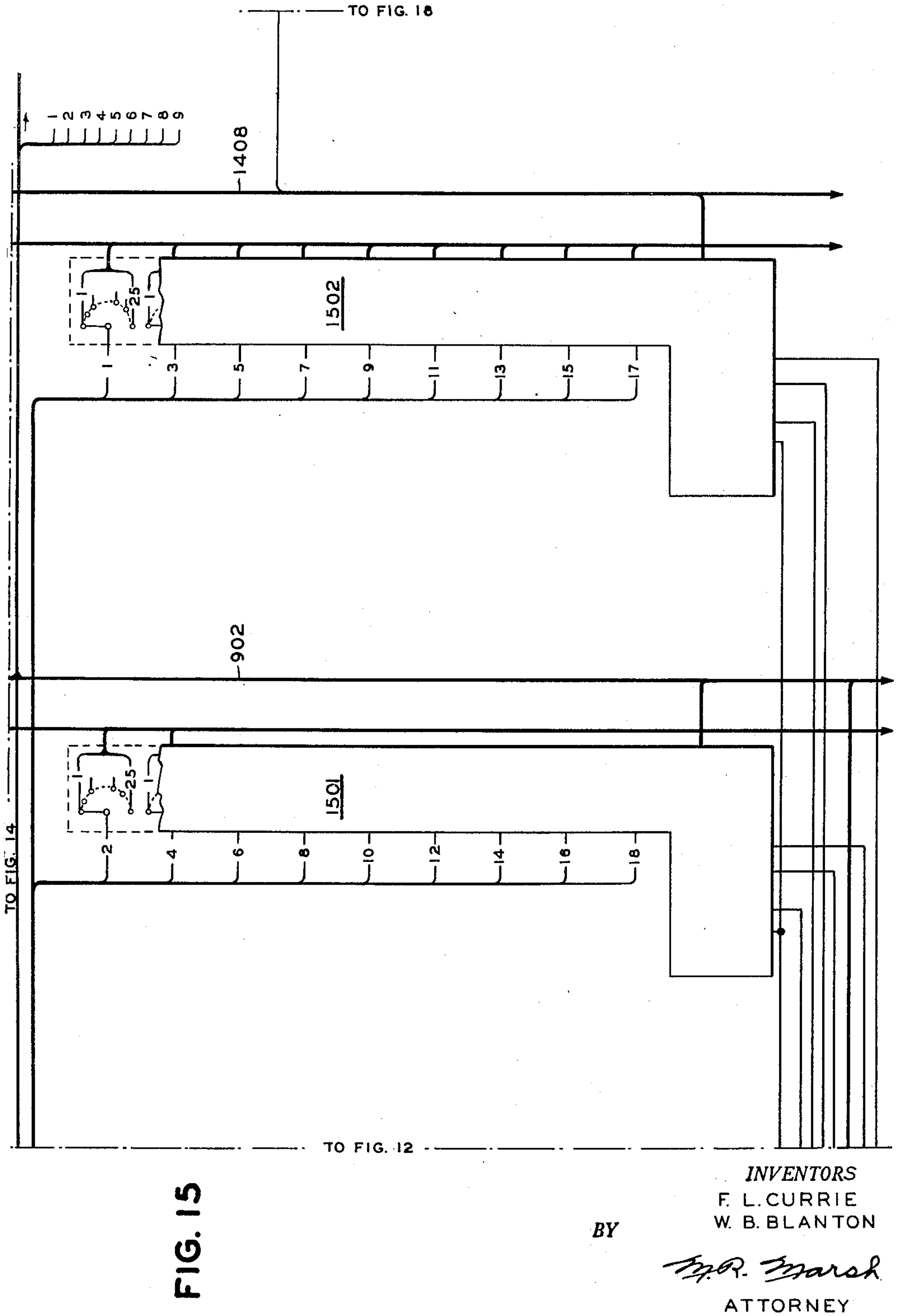
Figure 16:
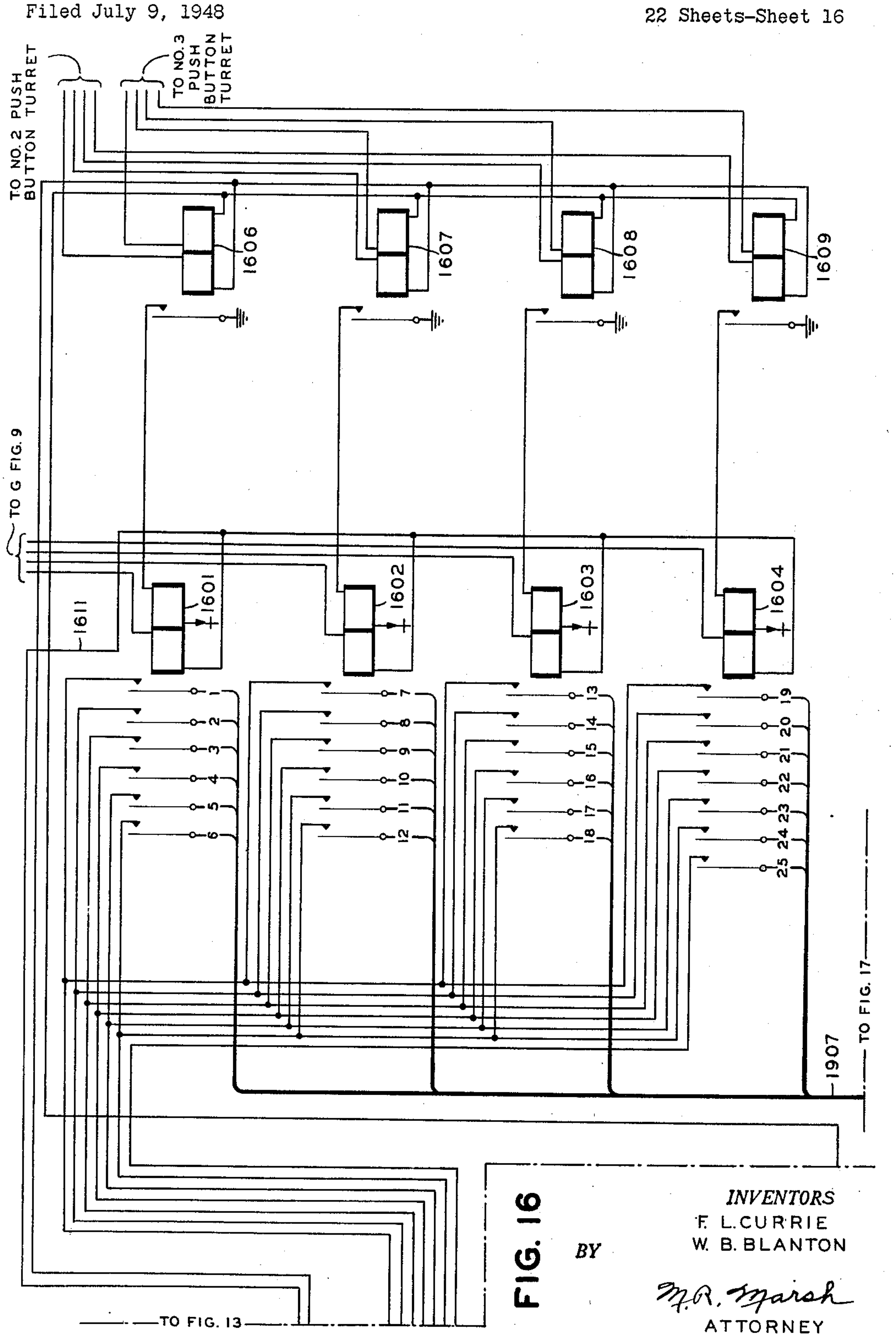

The circuits through the upper pair of contacts of destination push buttons in groups A to H select the rotary switch in the sharing connector and the quadrant of the switch points containing the desired intraoffice path. These upper contacts of each group of twenty-five destination push buttons are multipled in three groups, of nine, eight and eight, and each of these multiples is used to control different rotary switches of the sharing connector. The lower springs of the upper pair of contacts of these push buttons are multipled as indicated in Figs. 4 and 9 in groups of six, six, six and seven for each push button group, and the connections from these multiples determine the quadrant of the rotary switch in a sharing connector in which the selected intraoffice path will appear.

The lower pair of contacts of the groups A to H mark the lower or marking level of the sharing connector rotary switches. The upper springs of the lower pair of contacts of these push buttons are grounded, and the lower contacts of every seventh push button are multipled together so as to form six multiples of four push buttons per multiple from each of the eight push button groups. That leaves one push button, the twenty-fifth in each group, not included in one of the multiples. The six multiples and the twenty-fifth point are connected to the same multiples and the twenty-fifth point of all the push buttons of groups A to H inclusive and a connection from each of those multiples or a total of seven is used for marking. With this arrangement only seven cross office conductors are required for each turret for marking any of the intraoffice transmission paths appearing on the twenty-four rotary switches of the sharing connector.

*Operation of destination push buttons group A*

The operation of the sharing connector will now be described in connection with the establishment of an intraoffice transmission path therethrough to a sending circuit represented by the destination push button A—1. As set forth above, all switching operations are initiated by depressing the transmitter initiate push button of the intraoffice transmitter circuit having the message to be switched which causes operation of relays 501 and 601.

As noted above, the sharing connector includes a number of rotary switches which are common to a plurality of turrets each of which may have several receiving positions associated therewith. In the specific arrangement disclosed, provision is made for the employment of some twenty-four sharing connector rotary switches, each with twenty-five points on the multiple levels thereof. Figs. 13, 16, 17, 18, 19 and 20 disclose the common equipment of the sharing connector and the equipment of two sections as well as parts of other sections.

Figure 19:
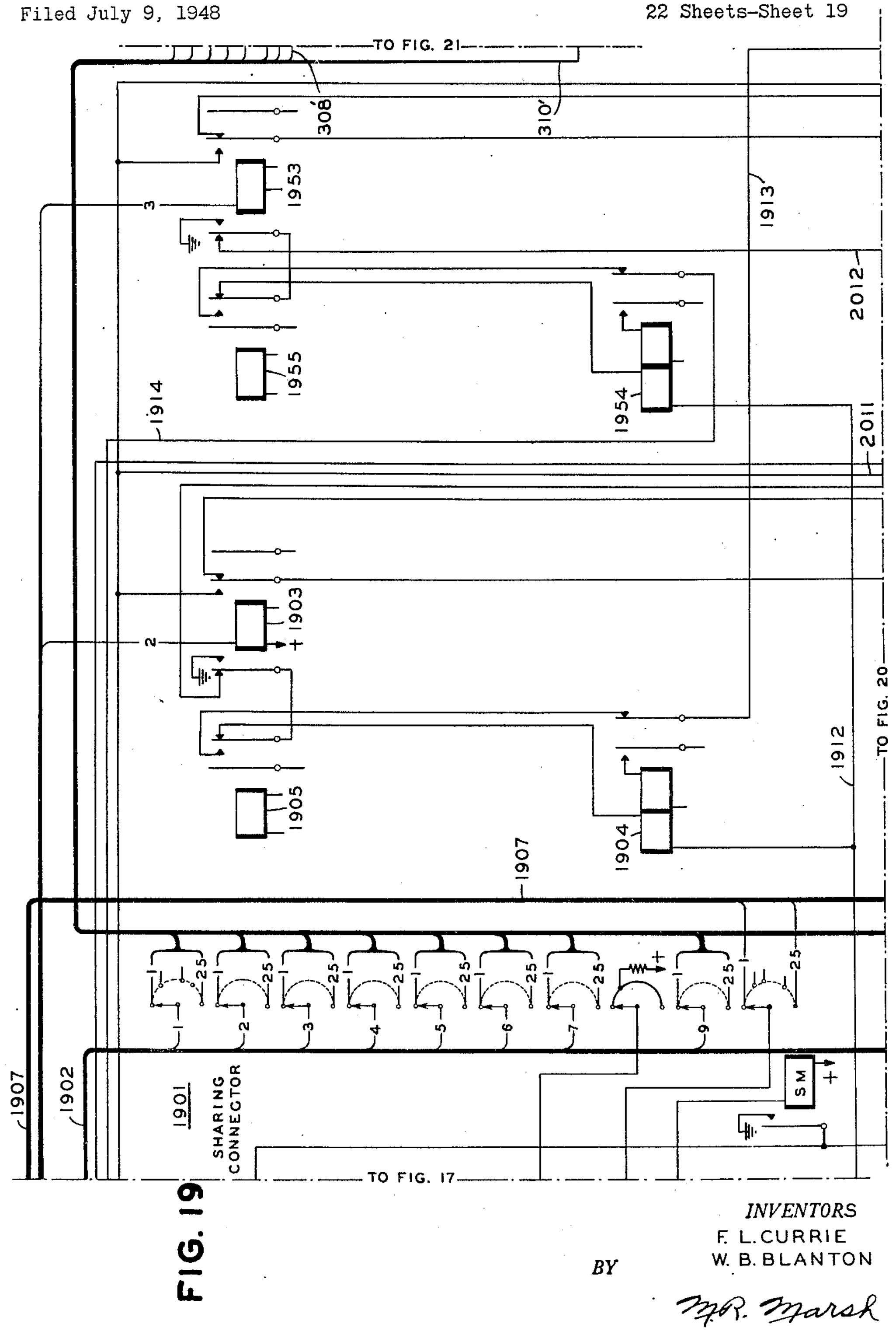
Figure 20:
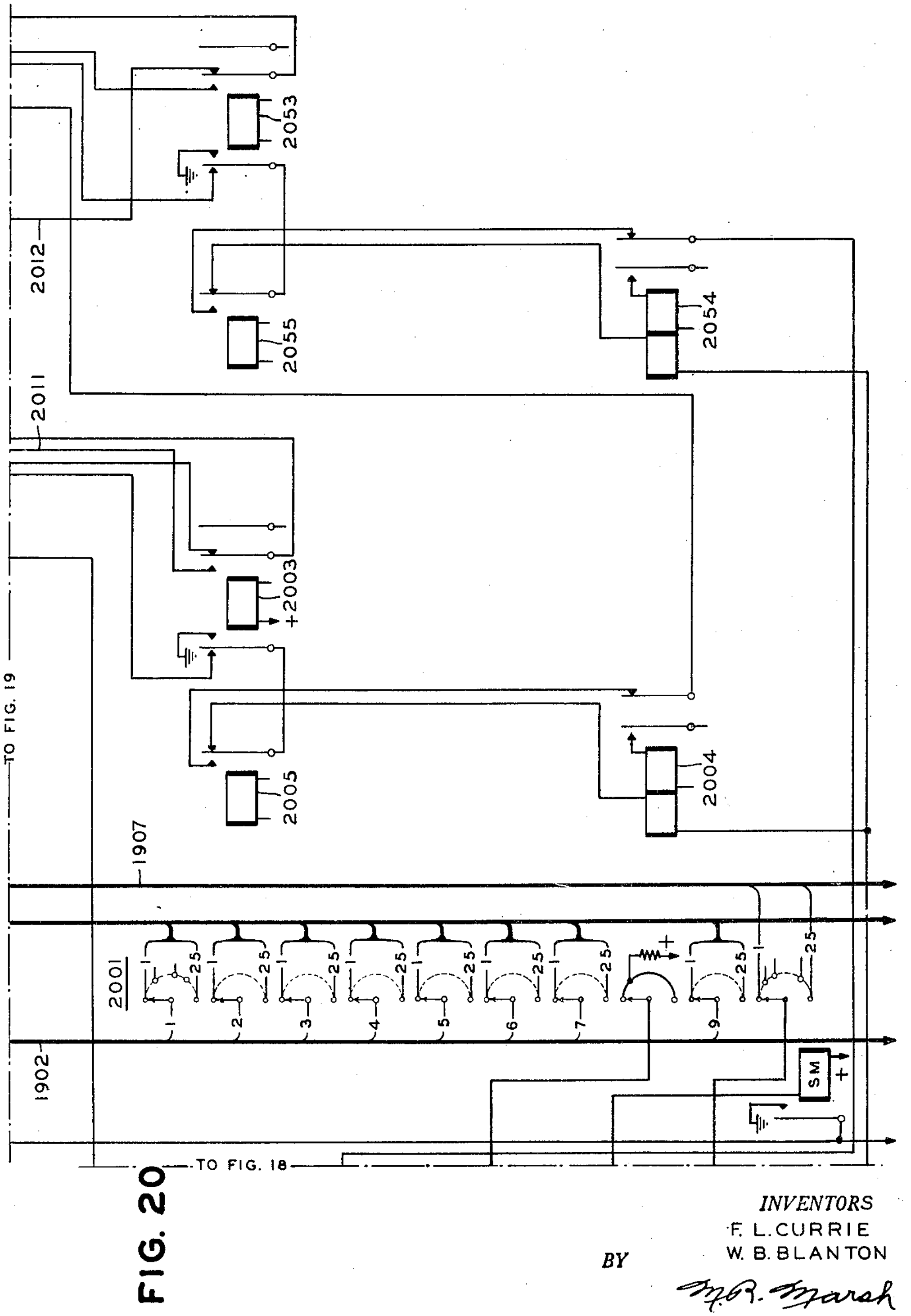

In Figs. 19 and 20 rotary switches 1901 and 2001 represent the rotary switches of two sections of the sharing connector and as indicated the upper seven and ninth wipers of these switches are connected by cables 1902 and 1903 to representative sets of points on the sharing selector rotary switches, such as 1402, 1502 of all such switches in the three turrets associated with the sharing connector. The wipers of the eighth levels of switches 1901 and 2001 are connected to tongues of associated control relays, the front contacts of which extend to respective points in the eighth level of switches 1402 and 1502.

Figure 17:
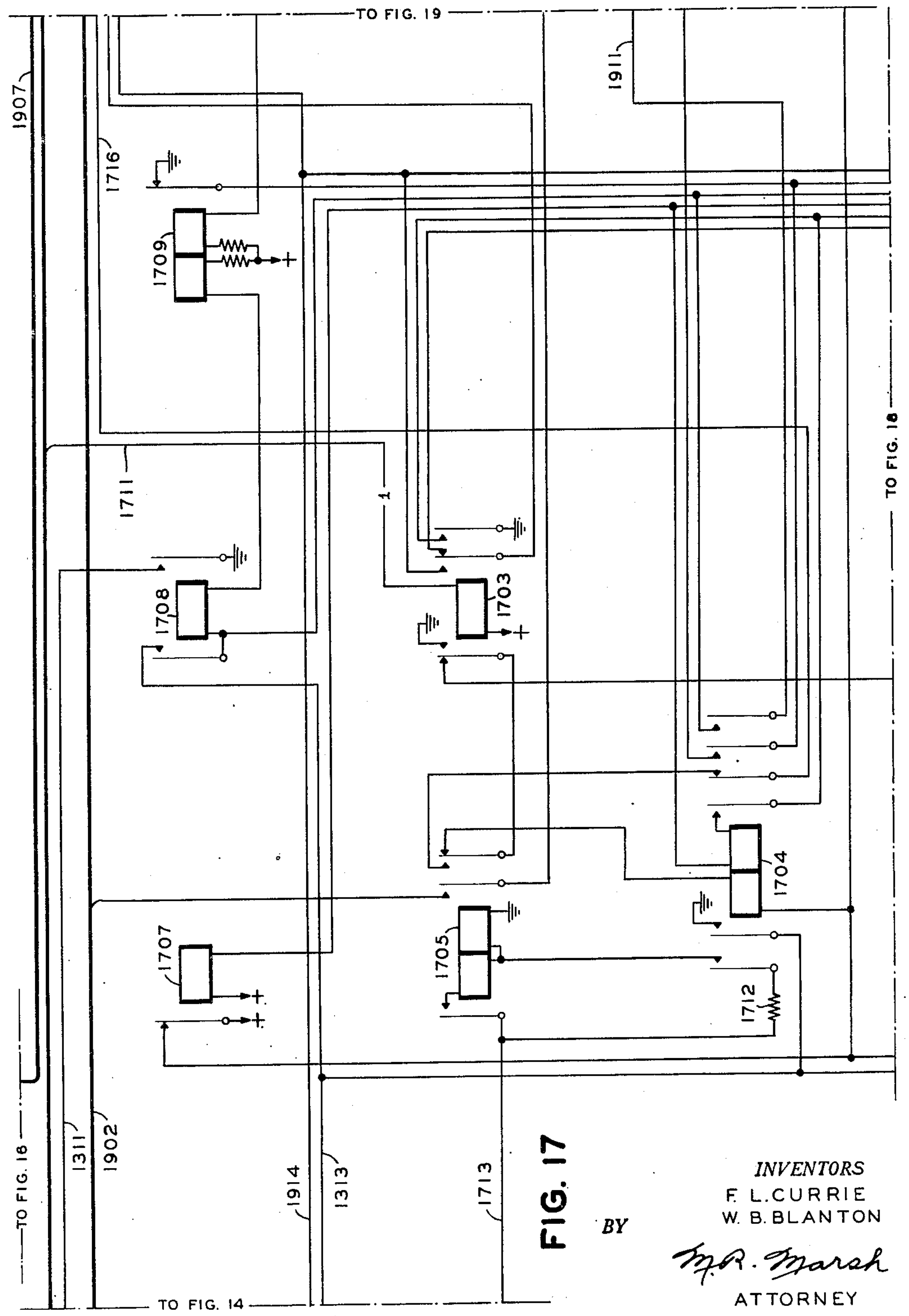
Figure 18:
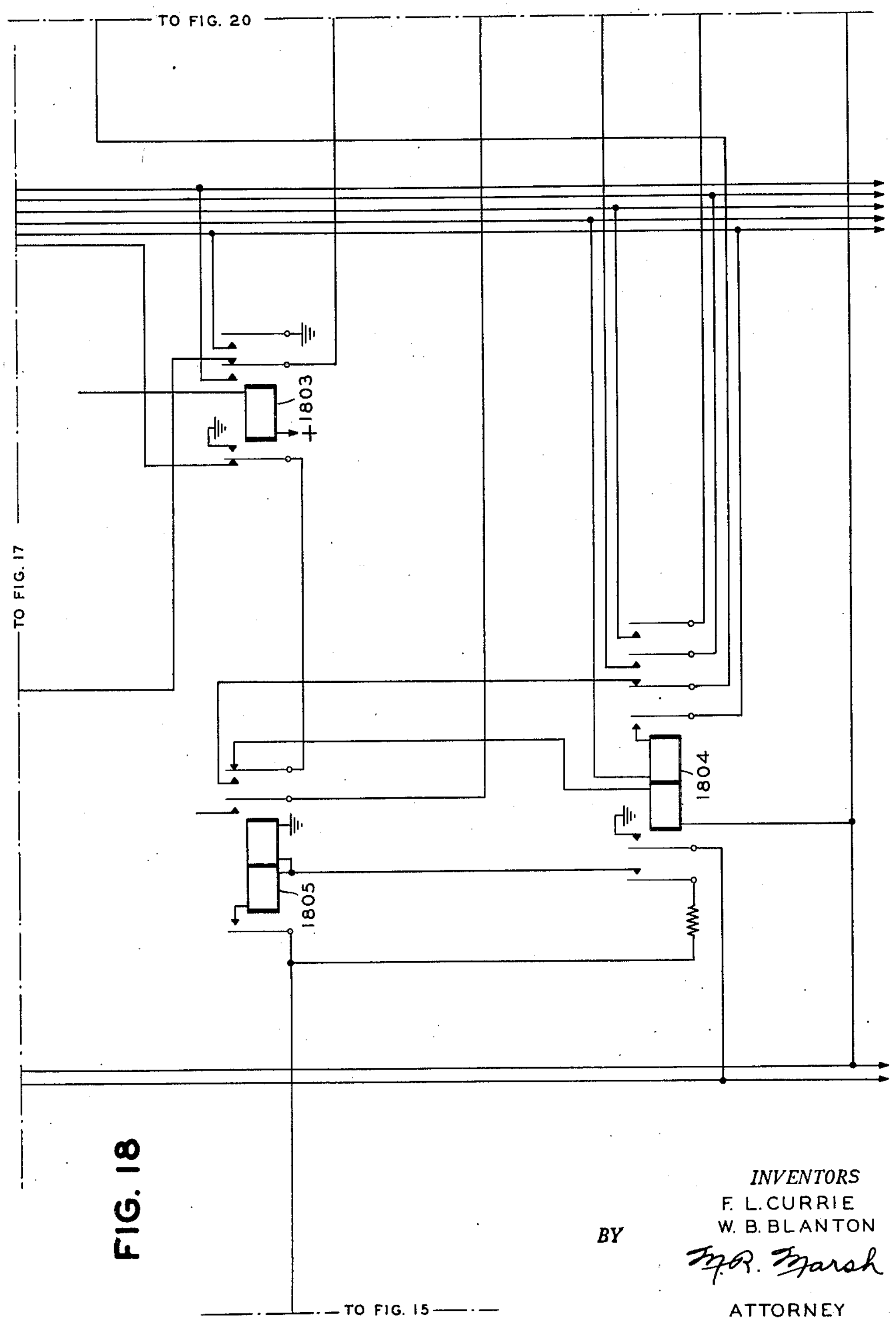

Each sharing connector rotary switch such as 1901 and 2001 has individually associated therewith a set of three relays which operate in conjunction therewith. The three relays for rotary switch 1901 are shown in Fig. 17 and are referred to as the sharing selector relay 1703, the sharing start relay 1704, and the sharing disconnect relay 1705. Corresponding relays 1803, 1804 and 1805 for the rotary switch 2001 are shown in Fig. 18. The sharing selector relays 1903, 1953, 2003 and 2053, the sharing start relays 1904, 1954, 2004 and 2054 and the sharing disconnect relays 1905, 1955, 2005 and 2055 for other sections of the sharing connector are shown without their associated rotary switches.

The common relays of the sharing connector include a so-called sharing start control relay 1707, a sharing cut-off relay 1708, a sharing pulsing relay 1709, four sharing group A relays 1601, 1602, 1603 and 1604 and four sharing group B and C relays 1606, 1607, 1608 and 1609. Also included in the common control equipment for the sharing connector is a pair of relays for each turret, a so-called direct sharing seize relay and a so-called direct sharing marking relay. Relay 1301 is the direct sharing seize relay for the turret shown and relay 1304 is the direct sharing marking relay for the same turret. Relays 1351, 1354, 1361 and 1364 are similar relays for the other turrets.

For the time being it will be assumed that a message is to be switched to the sending position represented by the first or No. 1 push button in the A group of destination push buttons and that the connection to this sending position may be established through either the sharing connector rotary switches 1901, or those not shown but associated with control relays 1903, 1904 and 1905 or 1953, 1954 and 1955. It will also be assumed that rotary switch 1901 has the first appearance of this sending circuit, rotary switch of relays 1903 to 1905 the second, and the rotary switch of relays 1953 to 1955 the third.

The depression of group A—1 destination push buttons completes a circuit (assuming all three direct sharing seize relays 1301, 1351 and 1361 are released) for the operation of the sharing selector relay 1703, the sharing group A relay 1601 and the direct sharing seize relay 1301 of this turret. It will be noted that this includes the sharing selector relay 1703 associated with the rotary switch 1901 having the first appearance of the desired sending position. The circuit for the operation of the above relays may be traced from battery through the coil of relay 1703, conductor 1711, the upper pair of contacts of push button No. 1 group A, conductor 906, the left hand winding of relay 1601, conductor 1611, back contacts of relays 1361 and 1351, the right hand winding of relay 1301, conductor 1308, the back contact and outer left hand tongue of relay 1004, the front contact and fourth right hand tongue of relay 501 and the outer left hand tongue and back contact of relay 1003 to ground. The above circuit may be referred to as the sharing seize circuit and includes back contacts of the direct sharing seize relays 1351 and 1361 associated with the other turrets so that only one may have control of the sharing equipment at any one time and through the direct common relay 501 of the turret from which the switch is being made to insure against seizing control of the sharing equipment when no intraoffice transmitter circuit is conditioned for switching. The circuit also includes back contacts of relays, direct relay No. 2 and direct relay No. 3, 1003 and 1004, respectively, to prevent an operated one of the push buttons of groups A to H representing the sharing connections from being effective at the same time one of the J or K group push buttons representing the directly served sending positions of the same turret is being used. The lower pair of contacts of push button No. 1 group A mark the sharing connector switches.

Corresponding points on the marking or lower levels of all of the rotary switches such as 1901 and 2001 of the sharing connector are multipled together, that is, the No. 1 points of each of these switches are multipled together as are all other correspondingly numbered points, and these multiples by means of the twenty-five conductor cable 1907 terminate on individual tongues of the sharing group A relays 1601 to 1604. As indicated, relays 1601, 1602 and 1603 each terminate a group of six of these multiples and relay 1604 terminates a group seven. Only one of the group A relays 1601 to 1604 operates at a time through a circuit such as that described hereinbefore, and the operation thereof together with the operation of the turret's direct sharing marking relay such as 1304 establish the marking circuit for the sharing connector switches. Such a circuit originates at ground and extends through the lower pair of contacts on the depressed destination push button and, assuming the No. 1 push button in the A group is depressed, this ground will be extended over a conductor of cable 910, the inner right hand tongue and front contact of relay 1304, to the front contact of each of the inner tongues of relay 1601 to 1604. Since only relay 1601 to 1604 will be operated under the assumed conditions, this ground will be applied to only one of the multiples of cable 1907 and for the assumed conditions will extend to the No. 1 points on all the marking levels of the sharing connector rotary switches such as 1901. At this time the same point on all the marking levels of the sharing connector rotary switches will be marked and the sharing selector relay such as 1703 of the rotary switch having the first appearance will be energized.

The operation of the sharing selector relay 1703 will cause either its associated sharing start relay 1704 to operate if the associated rotary switch 1901 is idle and has no other transmission path established therethrough, or if this rotary switch is busy the sharing start relay such as 1904 of the second appearance if this is idle; but if its associated sharing selector rotary switch is also busy, it will cause the operation of sharing start relay 1954 of the third appearance sharing selector rotary switch. If the third appearance is also busy, the turret busy lamp 407 is caused to glow. In other words, if the rotary switch of sharing start relay 1704, is busy, relay 1904 will operate; if both rotary switches of the sharing start relays 1704 and 1904 are busy, the sharing start relay 1954 will operate, and if all three are busy, the direct busy relay 511 will operate to complete a circuit to the turret busy lamp 407. The glowing of this lamp signals the attendant that the three rotary switches having the three appearances of the desired sending circuit are busy and have other transmission pa.hs established therethrough and that she must wait until one of them is released before the transmission path desired can be established. For the time being let it be assumed that the rotary switch 1901 of the first appearance of the destination represented by the No. 1 destination push button of the A group is idle. Then the operation of corresponding relay 1703 effects operation of the associated sharing start relay 1704.

The circuit for operating relay 1704 may be traced from ground through the front contact and left hand tongue of relay 1703, the right hand tongue and back contact of relay 1705, the left hand coil of relay 1704 and the back contact and tongue of the sharing start control relay 1707 to battery. In addition the operation of relay 1703 partly prepares a turret busy lamp circuit and completes a locking circuit for relay 1704. The latter circuit prevents a false operation of the second sharing start relay by the release of the first sharing start relay before the release of the selector relay 1703 at the end of a switching operation. The circuit for locking relay 1704 operated extends from ground at the outer right hand tongue and front contact of relay 1703, the inner right hand tongue and front contact of relay 1704, the right hand coil of this relay and the coil of relay 1707 to potential.

When relay 1301 operates on the completion of the described circuit through its left hand coil, it performs a number of functions which include the following: the extension of the cut-off circuit through its outer left hand tongue, conductor 1311, to a front contact on relay 1708 so that this relay 1708 as well as relays 503 and 506 must operate before the receiving cut-off relay 602 is operated; completes a circuit for the operation of the associated sharing marking relay 1304; completes a circuit for operating relay 504; opens the operating circuits for the other two direct sharing seize relays 1351 and 1361 to insure that neither of them will operate while the first is operated; completes a circuit through its right hand coil for locking itself operated; completes a circuit for operating the receiving position sharing relay 603; partially prepares the sharing busy circuit for operating relay 511 when required; marks the twenty-third point on the lower marking level of rotary switch 1101 and opens the operating circuits for relays 1003 and 1004.

The circuit for operating relay 504 may be traced from ground to the inner left hand tongue and front contact of relay 1301, conductor 1312, the front contact and outer right hand tongue of relay 501 and through the coil of relay 504 to potential. The locking circuit through the right hand coil of 1301 extends through the front contact and inner right hand tongue, conductor 1313 to ground at the inner left hand tongue and front contact of relay 1704. Relay 603 is operated by a circuit originating at ground on the second left hand tongue of relay 1301 and extending over conductor 1314 through the fourth right hand tongue and front contact of relay 601 and the coil of relay 603 to potential. The marking circuit of the twenty-third point on the marking level of rotary switch 1101 is from ground at the third left hand tongue and front contact of relay 1301 over conductor 1316 to the said point.

At this time relays 1301 and 1704 are operated for starting the rotary switches to search for the marked points on the marking level thereof. The wipers of the rotary switches involved start stepping simultaneously and may reach their respective marked points in any order. It makes no difference which switch steps to its marked point first or which is last and it will be assumed that the sharing connector switch 1901 is first, the sharing selector switch 1402 is second and the direct selector switch 1101 is third.

The operation of the sharing start relay 1704 prepares the sharing rotary switch cut-off circuit; prepares a circuit for operating relay 1705 after relay 602 operates; completes the locking circuit through the right hand coil of itself which also causes relay 1707 to operate and thereby disconnect operating battery from all the other sharing start relays such as 1904, 1954, 1804, 2004 and 2054; opens the so-called sharing answer-next circuit to prevent improper operation of other sharing start relays before release of relay 1703; completes a step magnet circuit for the sharing rotary switch 1901; and completes the above-described locking circuit for relay 1301.

The less obvious of the above circuits completed by the operation of relay 1704 include a circuit from ground at the outer right hand tongue and front contact of relay 1703, the inner right hand tongue, front contact and coil of relay 1704 and through the coil of sharing start control relay 1707 to battery; ground through the back contact and tongue of relay 1709, the third right hand tongue and front contact of relay 1707 and the coil of step magnet SM of rotary switch 1901 to battery.

*Operation of sharing connector rotary switch 1901*

When the circuit is completed through the step magnet SM of rotary switch 1901 and it is energized, the interrupter springs complete a circuit through the right hand coil of relay 1709 to operate the same. The latter relay in operating opens the circuit to the step magnet SM whereupon it releases and effects advancement of the wipers one point and through its interrupter springs opens the circuit to the right hand coil of relay 1709. The release of relay 1709 causes the step magnet SM to operate again and cause reoperation of relay 1709 in the manner described. Such operations of the step magnet SM and relay 1709 continue until the wipers of the lower or marking level of switch 1901 reach the marked point which for the assumed conditions is the No. 1 point. When this point is reached the ground thereat is extended over conductor 1911 through the outer right hand tongue and front contact of relay 1704 and coil of relay 1708 and the left hand coil of relay 1709 to potential. This circuit operates the sharing cut-off relay 1708 and holds the sharing pulsing relay 1709 operated and thus prevents reenergization of the step magnet SM.

The operation of the sharing cut-off relay 1708 partially prepares the operating circuit for relay 602 and completes a locking circuit for itself and relay 1709 by a circuit through a front contact to ground of relay 1704.

*Operation of sharing selector switch 1402*

When relays 504 and 1304 are operated, a circuit is completed for the step magnet SM of sharing selector switch 1402. This circuit may be traced from battery through the second left hand tongue and front contact of relay 504, the tongue and back contact of relay 502, conductor 1008, the front contact and outer left hand tongue of relay 1304, conductor 1317, the coil of step magnet SM of rotary switch 1402, conductor 1406, a tongue and front contact of relay 1102, conductor 512, the inner right hand tongue and front contact of relay 501 and the right hand tongue and back contact of relay 511 to ground.

As the step magnet SM energizes its interrupter springs complete a circuit from ground over conductor 1407 and through the right hand coil of relay 502 to potential. This circuit operates relay 502 which in turn interrupts the circuit to the step magnet SM which releases and interrupts the circuit to the right hand coil of relay 502. The release of relay 502 reestablishes the step magnet circuit and such energization and release of the step magnet SM and relay 502 continue until the wipers on the lower or marking level of rotary switch 1402 reach the grounded or marked point which for this instance will be the No. 1 point. When the marked point is reached, relay 502 is locked operated so as to prevent further stepping of the switch and a circuit is completed for operating relay 503. These circuits may be traced from ground through the right hand coil of relay 1705, the front contact and outer left hand tongue of relay 1704, resistance 1712, conductor 1713, one of the twenty-four conductors of cable 1408, the first point and wiper of the lower level of the sharing selector rotary switch 1402, conductor 1409, the outer tongue and front contact of relay 603, the third right hand tongue and back contact of relay 602, conductor 608, the third right hand tongue and front contact of relay 501, the left hand coil of relay 502 and the coil of relay 503 to potential. Also a parallel path to battery is also completed through the left hand winding of relay 502 through contacts of relay 501 to potential.

The operation of relay 503, the direct cut-off relay, prepares a circuit for holding itself operated after all the rotary switches have reached their marked points or after relay 511 operates, until the actuated destination push button is released. The operation of relay 503 also further locks relay 601 operated and further prepares the operating circuit for relay 602.

*Operation of direct selector rotary switch 1104*

When relay 504 operates it also completes a circuit for operating the step magnet SM of rotary switch 1101 and this circuit extends from battery at the outer left hand tongue and front contact of relay 504 through the back contact and tongue of relay 1002, conductor 1107, the coil of step magnet SM and through a tongue and front contact of relay 1102 to ground over the conductor 512. The operation of the step magnet SM through its interrupter springs completes a circuit for operating relay 1002 which then opens the step magnet circuit. This releases the step magnet SM and these operations continue until the wipers of rotary switch 1101 reach the points corresponding to the marked point on the lower marking level which for the assumed condition is the twenty-third point. When this point is reached, the ground thereat is extended through the wiper, conductor 1111, the third right hand tongue and front contact of relay 601, conductor 604, the left hand coil of relay 1002 and coil of relay 506 to battery. Relay 1002 is thereby locked operated and relay 506 in operating completes a circuit for operating relay 602 it being assumed that relay 1708 and 503 operate first. This circuit may be traced from ground through the right hand tongue and front contact of relay 1708, conductor 1311, the front contact and outer left hand tongue of relay 1301, conductor 1302, the inner right hand tongue and front contact of relay 503, the front contact and tongue of relay 506, conductor 507, the second left hand tongue and front contact of relay 601, the right hand coil of relay 602, conductor 313, the coil of relay 317, the back contact and inner right hand tongue of relay 302 and through resistance 318 to potential.

The completion of the above circuit effects energization of relays 602 and 317 which in operating complete functions hereinbefore set forth in connection with the description of establishing a transmission path to a directly associated sending position. In addition relay 602 in operating locks relay 603 operated and disconnects the wiper of the marking level of the sharing connector rotary switch 1901 from the cut-off relay connection and the connection thereof to battery through a low resistance. The purpose of this circuit is to busy the respective sharing connector rotary switch 1901 to all other receiving positions by operating the associated disconnect relay 1705. The circuit for relay 1705 is from battery through the front contact and third right hand tongue of relay 602, the front contact and tongue of relay 603, conductor 1409, the wiper and No. 1 point of the marking level of rotary switch 1402, conductor 1713, resistance 1712, front contacts of relay 1704 and the right hand coil of relay 1705 to ground.

More specifically, the operation of relay 1705 places the left hand coil thereof in parallel with a resistance 1712 so that when relay 1704 subsequently releases, the high resistance left hand coil limits the amount of current that can flow over the above circuit. Relay 1705 in operating also transfers the sharing answer-next circuit to the next sharing section and closes the initial seize intraoffice circuit so that intraoffice transmission of the message may be started.

The operation of relay 602 as set forth causes the release of relay 501. The latter relay in releasing as described opens the seize circuit which also passes through coils of relays 1703, 1601, and 1301 causing these relays to release. To insure against false operation of the sharing answer-next circuit, a predetermined release sequence of the above three relays is necessary and is achieved through locking circuits. Relay 1703 releases first, relay 1704 second, and relay 1301 third.

As relay 1703 releases, it opens the locking circuit for relay 1704 permitting it to release and restore the circuits of its other contacts to their normal idle condition. The release of relay 1704 opens the locking circuit for relays 1301, 1708 and 1709 permitting them to release; further opens the sharing connector rotary switch step magnet circuit; completes the sharing answer-next circuit; removes the shunt resistance 1712 from around the left hand winding of the left hand coil of relay 1705 and opens the sharing cut-off circuit from the marking level of its associated sharing connector rotary switch 1901.

The busying of a point on the marking level of the sharing selector switch 1402 is accomplished by placing sufficient resistance in this circuit to prevent other sharing selector switches of the turret from stopping on corresponding points or upsetting the conditions of the first connection established through such a point. The current permitted to flow is sufficient to maintain relay 1705 operated but insufficient to operate relays 502 and 503 of the same or another turret.

When the switching operations are completed and the transmission path to the desired sending position established through the involved rotary switches, the common sharing switching equipment is immediately released for use in establishing transmission paths from receiving positions of other associated turrets controlling the sharing equipment even though the destination push button is held depressed. This is possible since relays 1708 and 1709 release following the release of relay 1704 and make these relays available for a new operation and the release of relays 1301 and 1304 makes the sharing equipment available to the other associated turrets.

When relay 501 releases, the circuit to the turret busy lamp 407 is opened to extinguish the same and informs the attendant that the desired intraoffice transmission path has been established and that the depressed destination push button may be released. As set forth, the sharing equipment is made available for use by the other turrets upon the establishment of the desired intraoffice transmission path, although the direct equipment of the turret involved is held locked up until the destination push button is released. The release of relay 1304 following release of relay 1301 transfers the marking circuit of the destination push button from the sharing section multiples to a holding circuit for relay 503 whereby the relay is held operated as long as the destination push button is held depressed. Relay 503 remains operated during the travel time of relay 1304 because of its slow-to-release characteristic.

The release of the destination push button causes relays 502 and 503 to release and at this time the locking circuit of relay 602 is opened but it remains operated until the end of the message because of the circuit through its right hand coil. As relay 503 releases, it effects release of relay 601 and at this time relays 602, 603 and 1705 of the involved section of the sharing connector are the only switching relays operated for the switching operation just described.

The end of the message as set forth releases relay 323 of the intraoffice transmitter circuit which opens the circuit through the coils of relays 317 and 602. Relay 602 in turn releases relay 603, relay 1705 and relay 316 and extinguishes the transmitter switching lamp 213.

In the above-described switching operation, it was assumed that the sharing section having the first appearance of the destination represented by the A—1 destination push button was idle and that the desired transmission path was established through this section. The operation will now be described when the section of the first appearance is busy and the section of the second appearance idle, then the operation when the section of the first and second appearances are busy and the section of the third appearance idle and finally the operation when the sections of all three appearances are busy.

Each section of the sharing connector as set forth contains a sharing connector rotary switch, such as 1901, a sharing selector relay such as 1703, a sharing start relay such as 1704, and a sharing disconnect relay such as 1705. Each of the sharing connector rotary switches have in the embodiment disclosed twenty-five intraoffice circuits or sending positions connected to their stators in groups of nine, eight and eight. Each of these groups are multipled to three consecutively arranged switches and each group starts on a separate rotary switch. For example, the first group of nine intraoffice circuits starts on the first rotary switch, the next group of eight intraoffice circuits starts on the next rotary switch and the third group starts on the third rotary switch, etc. The intraoffice circuits which start on the twenty-third switch are multipled to the twenty-fourth and first and those which start on the twenty-fourth are multipled to the first and second. In this manner a chain arrangement is provided with each switch containing the first appearance of one group, the second appearance of another and a third of still another group. The interconnections for six sets of three each of the relays of each sharing connector section is shown in Figs. 17, 18, 19 and 20 as well as the sharing connector rotary switches 1901 and 2001 for the first and fourth of such groups.

A call is initiated in the answer-next circuit by operating the sharing selector relay, such as 1703, forming a part of the first appearance sharing section and it is assumed that the first section has the first appearance of the desired intraoffice circuit. Accordingly, relays 1703 will be operated as above set forth. If this section is idle, the start relay 1704 operates and establishes the transmission path. If this section is busy, relay 1705 will be operated and relay 1704 released. When this condition exists the operation of relay 1703 will complete a circuit from ground through its left hand tongue, the outer right hand tongue and front contact of relay 1705, the back contact and second right hand tongue of relay 1704, conductor 1716, the inner right hand tongue and back contact of relay 2003, conductor 2011, the back contact and left hand tongue of relay 1903, the outer right hand tongue and back contact of relay 1905 and the left hand coil of relay 1904 to conductor 1912 and back contacts of 1707 to potential. Thus, the sharing start relay 1904 of the second appearance of the desired intraoffice circuit is operated whereupon it functions in the manner set forth to complete the intraoffice circuit through its associated rotary switch in the same manner as the intraoffice circuit was established through rotary switch 1901. If both the first and second sections are busy associated relays 1705 and 1905 will be operated and relays 1704 and 1904 released. The operation of relay 1703 under this condition completes a circuit as described to the outer right hand tongue of relay 1905, and because this relay is operated, the circuit is extended through the associated front contact, the back contact and outer right hand tongue of relay 1904, conductor 1913, the inner right hand tongue and back contact of relay 2053, conductor 2012, the back contact and left hand tongue of relay 1953, the outer right hand tongue and back contact of relay 1955 and through the left hand coil of relay 1954 to potential over conductor 1912. This circuit effects operation of relay 1954 whereby the desired intraoffice transmission path is established through the section having the third appearance.

When the sections having all three appearances of the desired intraoffice circuit are busy, all three associated sharing disconnect relays such as 1705, 1905 and 1955 will be operated and the operation of relay 1703 at this time will apply the above ground circuit through the tongue and front contact of relay 1955, the back contact and outer tongue of relay 1954, conductor 1914, the fourth tongue and right hand contact of relay 1301, conductor 1318 and the coil of direct busy relay 511 to potential. Operation of this relay completes a circuit through its outer left hand tongue for the operation of the turret busy lamp 407.

The illumination of the turret busy lamp 407 informs the attendant the rotary switches of all three appearances of the desired sending circuit are busy. The attendant may thereupon wait until one of the rotary switches become available or she may proceed to switch messages from other receiving positions. However, before other messages can be switched some of the operated relays must be released and this is accomplished by operating a turret clear-out push button 408 to short-circuit the battery employed in the operating circuit for relay 601 whereby the relay is released and permits operation of other such relays.

While the invention has been described in but a single embodiment thereof, it will be understood that various modifications and changes may be made therein without departing from the spirit or essential attributes thereof, and it is desired that only such limitations be placed thereon as are specifically set forth in the appended claims.

What is claimed is:

1. In a telegraph switching system, a storage controlled telegraph transmitter, a plurality of outgoing telegraph channels, a plurality of separate independently operable switching units associated with said transmitter for establishing transmission paths from said transmitter to associated channels, each of said units being capable of establishing a path to a plurality of said channels and a path to any one of said channels being capable of being established through a plurality of said units one at a time, a plurality of manually operable elements for indicating a channel to which a path is to be established, means operative in response to the actuation of one of said elements for conditioning for operation the plurality of units having the representative channel associated therewith, and means for establishing the path through one of said conditioned units.

2. In a telegraph switching system, a storage controlled telegraph transmitter, a plurality of outgoing telegraph channels, a plurality of rotary switches for establishing transmission paths therethrough from said transmitter to any one of said channels with each of said channels appearing on a plurality of said switches, a plurality of manually operable elements, one for each channel, for designating the channel to which a path is to be established, means responsive to the actuation of any one of said elements for operatively conditioning the switches through which a desired path may be established, and means controlled by the busy and idle conditions of said conditioned switches for determining the one through which a path is established.

3. In a telegraph switching system, a storage controlled telegraph transmitter, a plurality of outgoing telegraph channels, a plurality of rotary switches for establishing transmission paths therethrough from said transmitter to any one of said channels with each of said channels appearing on a plurality of said switches, a plurality of manually operable elements, one for each channel, for designating the channel to which a path is to be established from said transmitter, means responsive to the actuation of any one of said elements for marking a point on each of the switches through which the desired path may be established, and means for establishing the desired transmission path through one of the marked switches selected in a predetermined order.

4. In a telegraph switching system, storage controlled telegraph transmitters, a plurality of outgoing telegraph channels, a plurality of rotary switches for establishing transmission paths therethrough from said transmitters to any one of said channels with each of said channels appearing on a plurality of said switches, a plurality of sets of manually operable elements, one element of each set for each channel, for designating the channel to which a path is to be established from a transmitter, means responsive to the actuation of any one of said elements of a set for marking a point on each of the plurality of the switches through which the desired path may be established, and means for preventing the marking of said switches by operation of other of said elements for establishing the desired transmission path through one of the marked switches selected in a predetermined order.

5. In a telegraph switching system, storage controlled telegraph transmitters, a plurality of outgoing telegraph channels, a plurality of rotary switches for establishing transmission paths therethrough from said transmitters to any one of said channels with said paths capable of being established to the same channel through any one of a plurality of said switches, a plurality of manually operable elements, one for each channel, for designating the channel to which a path is to be established, means responsive to the actuation of any one of said elements for operatively conditioning the group of switches through which a desired path may be established, and means controlled by an answer-next arrangement whereby the desired path is established through the first idle switch of the conditioned group.

6. In a telegraph switching center, incoming and outgoing telegraph channels, a plurality of sets of manual control elements, one element of each set for each outgoing channel, a plurality of switching units for establishing transmission paths from any one of said incoming channels to any one of said outgoing channels with some of said switching units being individual to an associated set of control elements and others of said switching units being common to said plurality of sets of control elements, means responsive to the operation of predetermined of the elements of a set to establish a transmission path through the individually associated switching units, and means responsive to the operation of other elements of a set to establish a transmission path through the common switching units.

7. In a telegraph switching center, incoming and outgoing telegraph channels, a plurality of sets of manual control elements, one element of each set for each outgoing channel, a plurality of switching units for establishing transmission paths from any one of said incoming channels to any one of said outgoing channels with some of said switching units being individual to an associated set of control elements and others of said switching units being common to said plurality of sets of control elements, means responsive to the operation of predetermined of the elements of a set to establish a transmission path through the individually associated switching units, means responsive to the operation of other elements of a set to establish a transmission path through the common switching units, and means for seizing control of said common switching units to the exclusion of the other sets of control elements when one of the elements of a set controlling the same is operated.

8. In a telegraph switching center, incoming and outgoing telegraph transmission channels, a plurality of switching units for establishing transmission path from any one of said incoming channels to any one of said outgoing channels, said switching units being made busy by the establishment of a transmission path therethrough and a path to any outgoing channel being capable of being established through any one of a plurality of said switching units, a set of manual control elements one for each outgoing channel for controlling operation of said switching units, and means controlled by a busy condition of a switching unit to condition other switching units having common outgoing channels for operation to establish transmission paths in response to the operation of control elements representing such channels.

FRANK L. CURRIE.
WILLIAM B. BLANTON.

REFERENCES CITED

The following references are of record in the file of this patent:

UNITED STATES PATENTS

| Number | Name | Date |
|---|---|---|
| 2,227,121 | Blanton | Dec. 31, 1940 |
| 2,344,759 | Wight | Mar. 21, 1944 |
| 2,390,517 | Currie et al. | Dec. 11, 1945 |
| 2,390,656 | Fitch et al. | Dec. 11, 1945 |